US012223853B2

(12) United States Patent
Cai et al.

(10) Patent No.: US 12,223,853 B2
(45) Date of Patent: Feb. 11, 2025

(54) METHOD AND SYSTEM FOR OBTAINING ACOUSTICAL MEASUREMENTS

(71) Applicant: Harman International Industries, Incorporated, Stamford, CT (US)

(72) Inventors: Tingli Cai, Ann Arbor, MI (US); Martin Olsen, Struer (DK); Christopher Michael Trestain, Livonia, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 251 days.

(21) Appl. No.: 17/938,288

(22) Filed: Oct. 5, 2022

(65) Prior Publication Data

US 2024/0119864 A1  Apr. 11, 2024

(51) Int. Cl.
  *G09B 23/14*  (2006.01)
  *G06F 3/16*  (2006.01)
  (Continued)

(52) U.S. Cl.
  CPC .............. *G09B 23/14* (2013.01); *G10L 19/02* (2013.01); *H04R 1/083* (2013.01); *H04R 1/222* (2013.01);
  (Continued)

(58) Field of Classification Search
  CPC ......... G09B 23/14; G10L 19/02; H04R 1/083; H04R 1/222; H04R 3/005; H04R 2499/13; G06F 3/165
  See application file for complete search history.

(56) References Cited

U.S. PATENT DOCUMENTS 4,739,513 A * 4/1988 Kunugi ................. H03G 5/165
                                                    381/26
5,764,777 A    6/1998 Goldfarb
(Continued)

FOREIGN PATENT DOCUMENTS

CN    1661353 A    8/2005
CN    101998222 A    3/2011
(Continued)

OTHER PUBLICATIONS

European Patent Office, Extended European Search Report Issued in Application No. 23199607.5, Mar. 4, 2024, Germany, 10 pages.
(Continued)

*Primary Examiner* — Fan S Tsang
*Assistant Examiner* — David Siegel
(74) *Attorney, Agent, or Firm* — McCoy Russell LLP

(57) ABSTRACT

Various systems and methods are provided for conducting acoustical measurements via an inflatable mannequin. In one embodiment, a system comprises an inflatable mannequin that comprises a detachable mannequin head, a plurality of inflatable anatomical parts, and a plurality of configurable joints, an inflation system that calibrates and controls inflation of the plurality of anatomical parts of the inflatable mannequin; and a joint control system that calibrates and controls the plurality of configurable joints via joint motors. In another embodiment, a first method comprises selecting a mannequin profile based on sizes of anatomical parts of the inflatable mannequin and second method comprises conducting acoustical measurements with the selected mannequin profile. In this way, acoustical measurements may be conducted to develop audio processing schemes that widen the sweet spot in an interior of a vehicle.

19 Claims, 9 Drawing Sheets

(51) Int. Cl.
*G10L 19/02* (2013.01)
*H04R 1/08* (2006.01)
*H04R 1/22* (2006.01)
*H04R 3/00* (2006.01)

(52) U.S. Cl.
CPC ............. *H04R 3/005* (2013.01); *G06F 3/165* (2013.01); *H04R 2499/13* (2013.01)

(56) References Cited

U.S. PATENT DOCUMENTS

| | | |
|---|---|---|
| 5,862,227 A | 1/1999 | Orduña-Bustamante et al. |
| 7,864,632 B2 | 1/2011 | Pfaffinger |
| 8,160,282 B2 | 4/2012 | Christoph et al. |
| 8,175,286 B2 | 5/2012 | Bech et al. |
| 8,325,929 B2 | 12/2012 | Koppens et al. |
| 8,838,384 B1 | 9/2014 | Daily et al. |
| 8,855,341 B2 | 10/2014 | Kim et al. |
| 8,958,583 B2 | 2/2015 | Hess |
| 9,179,237 B2 | 11/2015 | Pan et al. |
| 9,247,370 B2 | 1/2016 | Mizuno et al. |
| 9,462,387 B2 | 10/2016 | Oomen et al. |
| 10,979,843 B2 | 4/2021 | Thagadur Shivappa |
| 2004/0170286 A1 | 9/2004 | Durach et al. |
| 2005/0264559 A1 | 12/2005 | Vesely et al. |
| 2008/0212788 A1 | 9/2008 | Bech et al. |
| 2008/0285775 A1 | 11/2008 | Christoph et al. |
| 2011/0103590 A1 | 5/2011 | Christoph et al. |
| 2012/0284148 A1 | 11/2012 | Volchek |
| 2017/0082208 A1 | 3/2017 | Rivas |
| 2018/0063641 A1* | 3/2018 | Lyren ...................... H04S 7/303 |
| 2019/0182594 A1* | 6/2019 | Oswald ................... H04S 7/303 |
| 2019/0182595 A1 | 6/2019 | Norris et al. |
| 2019/0191249 A1 | 6/2019 | Lyren et al. |
| 2020/0008503 A1* | 1/2020 | Nielson .................... A41H 5/02 |
| 2021/0029478 A1 | 1/2021 | Lane |
| 2022/0030373 A1 | 1/2022 | Mehta et al. |

FOREIGN PATENT DOCUMENTS

| | | |
|---|---|---|
| CN | 103471709 A | 12/2013 |
| CN | 102318374 B | 2/2015 |
| CN | 111935624 B | 4/2021 |
| CN | 106664497 B | 8/2021 |
| DE | 3146706 A1 | 6/1983 |
| DE | 102014210105 A1 | 12/2015 |
| EP | 0126783 A1 | 12/1984 |
| EP | 1838135 A1 | 9/2007 |
| EP | 1962560 A1 | 8/2008 |
| EP | 1475996 B1 | 4/2009 |
| EP | 1843636 B1 | 10/2010 |
| EP | 2792167 B1 | 3/2016 |
| EP | 2891337 B1 | 10/2016 |
| EP | 3144569 B1 | 1/2019 |
| JP | H05153687 A | 6/1993 |
| JP | H11504176 A | 4/1999 |
| JP | H11268593 A | 10/1999 |
| JP | 2004294444 A | 10/2004 |
| JP | 2007206603 A | 8/2007 |
| JP | 2008507006 A | 3/2008 |
| JP | 4508295 B2 | 7/2010 |
| JP | 2010272911 A | 12/2010 |
| JP | 2016126335 A | 7/2016 |
| JP | 6912967 B1 | 8/2021 |
| JP | 2021113046 A | 8/2021 |
| JP | 2021189014 A | 12/2021 |

OTHER PUBLICATIONS

LG, A. et al., Determination and Enlarging of the Acoustic Sweet-Spot in an Auditorium, International Journal of Innovative Science and Research Technology, vol. 2, No. 7, Jul. 2017, 4 pages.

Bhimani, Z., "In-Vehicle Loudspeaker Measurements and Distortion Audibility," Loud Speaker Industry Sourcebook Website, Available Online at https://www.loudspeakerindustrysourcebook.com/articles/in-vehicle-loudspeaker-measurements-and-distortion-audibility-29, Available as Early as Feb. 19, 2018, 6 pages.

* cited by examiner

METHOD AND SYSTEM FOR OBTAINING ACOUSTICAL MEASUREMENTS

FIELD

The present disclosure relates to a system and a method for a tuning process of an audio system of a vehicle.

BACKGROUND

The audio system of a vehicle is subjected to testing in order to obtain acoustical measurements that help facilitate the design of a sound field in the vehicle. As such, the driving posture of an operator or occupant of a vehicle may affect the acoustics of the vehicle. The head of a mannequin postured in a standard sitting position may be used to simulate the operator or occupant of the vehicle while acoustical measurements of the vehicle are conducted. Once the measurement data is obtained, the audio system may be tuned to construct a prescribed sound field around the head of a listener, referred to herein as a "sweet spot." However, it may be difficult to design and control the sound field of the vehicle due to variations in head shape and/or body shape of different operators or occupants and/or due to variations in posturing of the same operator or occupant. To capture variations in head shape and/or body size, different types of mannequins may be utilized while acoustical measurements are conducted. Additionally, the mannequin may be manually moved to capture the differences in posturing in order to account for acoustical variations in the tuning process and to widen the sweet spot. Still, the acoustical measurements obtained under these testing conditions prove to be inadequate for the construction of the sweet spot for different operators/occupants and the same operator/occupant over time.

SUMMARY

In various embodiments, the issues described above may be addressed by a system, comprising an inflatable mannequin that comprises a mannequin head, a plurality of inflatable anatomical parts, and a plurality of configurable joints. In an example, an inflation system controls inflation of the plurality of inflatable anatomical parts of the inflatable mannequin and/or a joint control system controls the plurality of configurable joints via joint motors.

In a further example, a system comprising an inflatable mannequin that includes an inflatable mannequin torso, inflatable mannequin arms, and inflatable mannequin legs that adjust the size or girth of a mannequin body, a series of configurable joints inside the mannequin body to position the inflatable mannequin into different postural configurations, a plurality of detachable mannequin heads with different shapes and sizes that may be connected to the mannequin body, and a plurality of microphones that may be embedded in the detachable mannequin head.

For example, the inflatable mannequin arms and inflatable mannequin legs may be inflated with an inflation mechanism that is controlled and calibrated by an electronic system (e.g., inflation system). As one example, the detachable mannequin head may be configured based on various point-to-point measurements (e.g., head circumference) of the detachable mannequin head with a pre-determined threshold for the point-to-point measurements. In another example, the motorized joints may position the inflatable mannequin in a plurality of postures in a postural configuration adjustment sequence to achieve various postural configurations, including mannequin head movement, tilting of the inflatable mannequin torso, and lounging or movement of the inflatable mannequin arms and legs. In particular, the motorized joints may be controlled and calibrated using an electronic system (e.g., joint control system).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be understood from reading the following description of non-limiting embodiments, with reference to the attached drawings, wherein below.

DETAILED DESCRIPTION

Figure 2A:
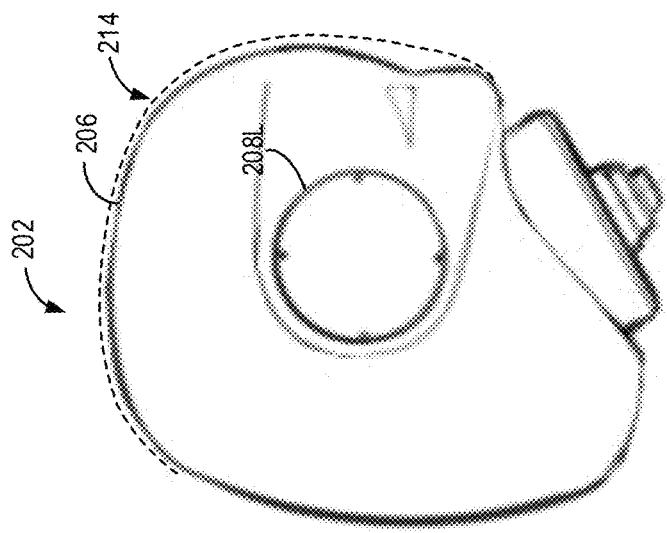
FIG. 2A and FIG. 2B show a schematic diagram of a profile view and frontal view of measurements of a mannequin head, according to one or more embodiments of the present disclosure.
Figure 2A:
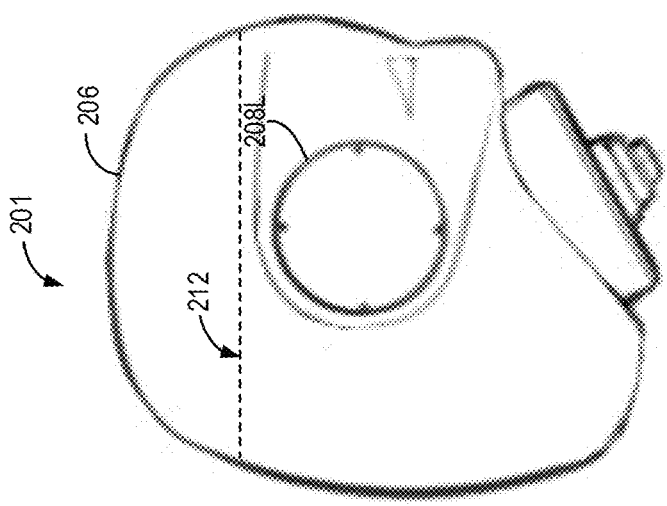
Figure 2A:
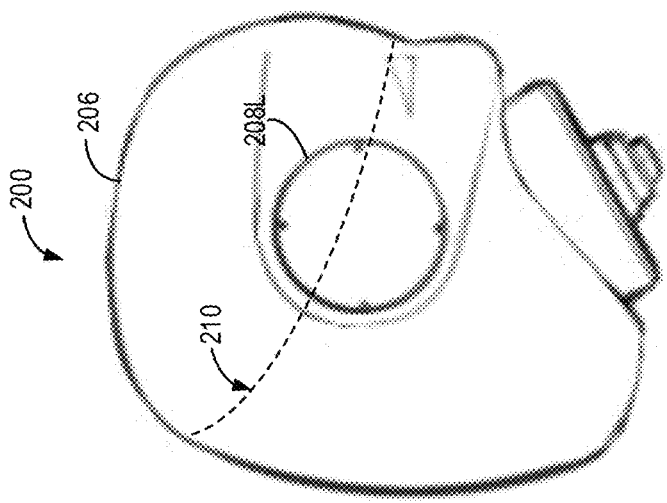
Figure 2B:
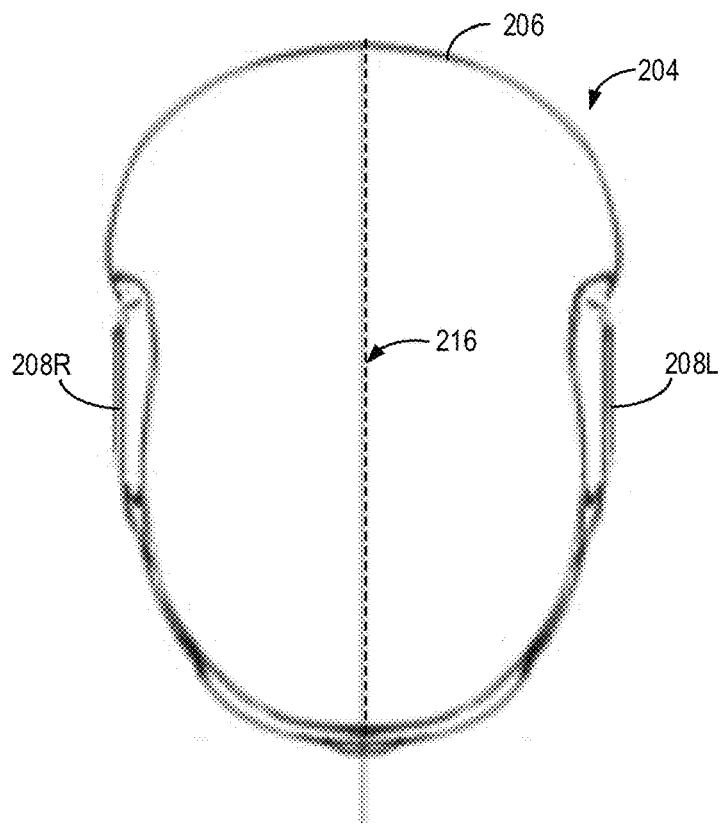
Figure 2B:
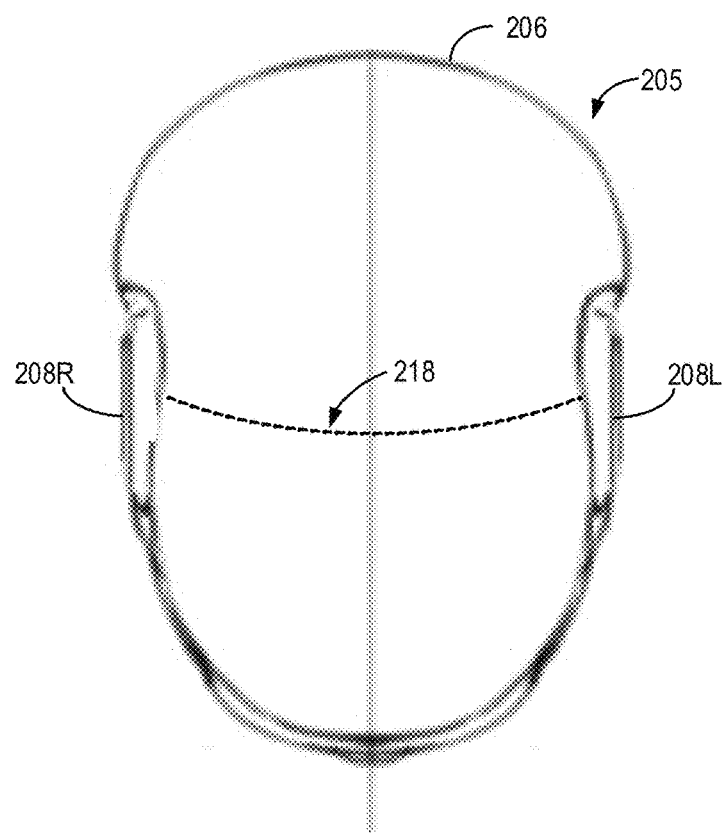
Figure 3A:
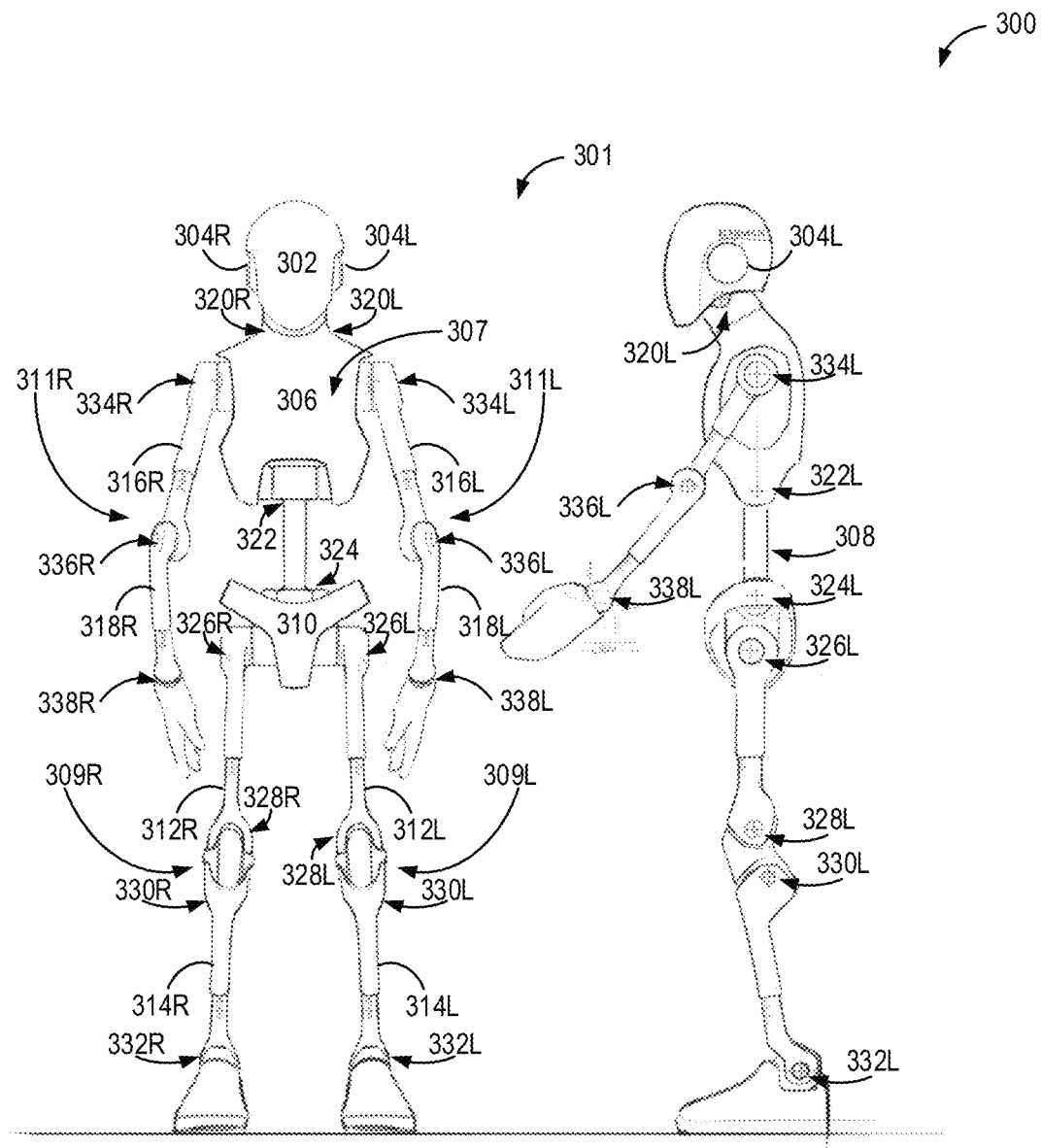
FIG. 3A, FIG. 3B, and FIG. 3C show a schematic diagram of an inflatable mannequin with a detachable mannequin head.
Figure 3B:
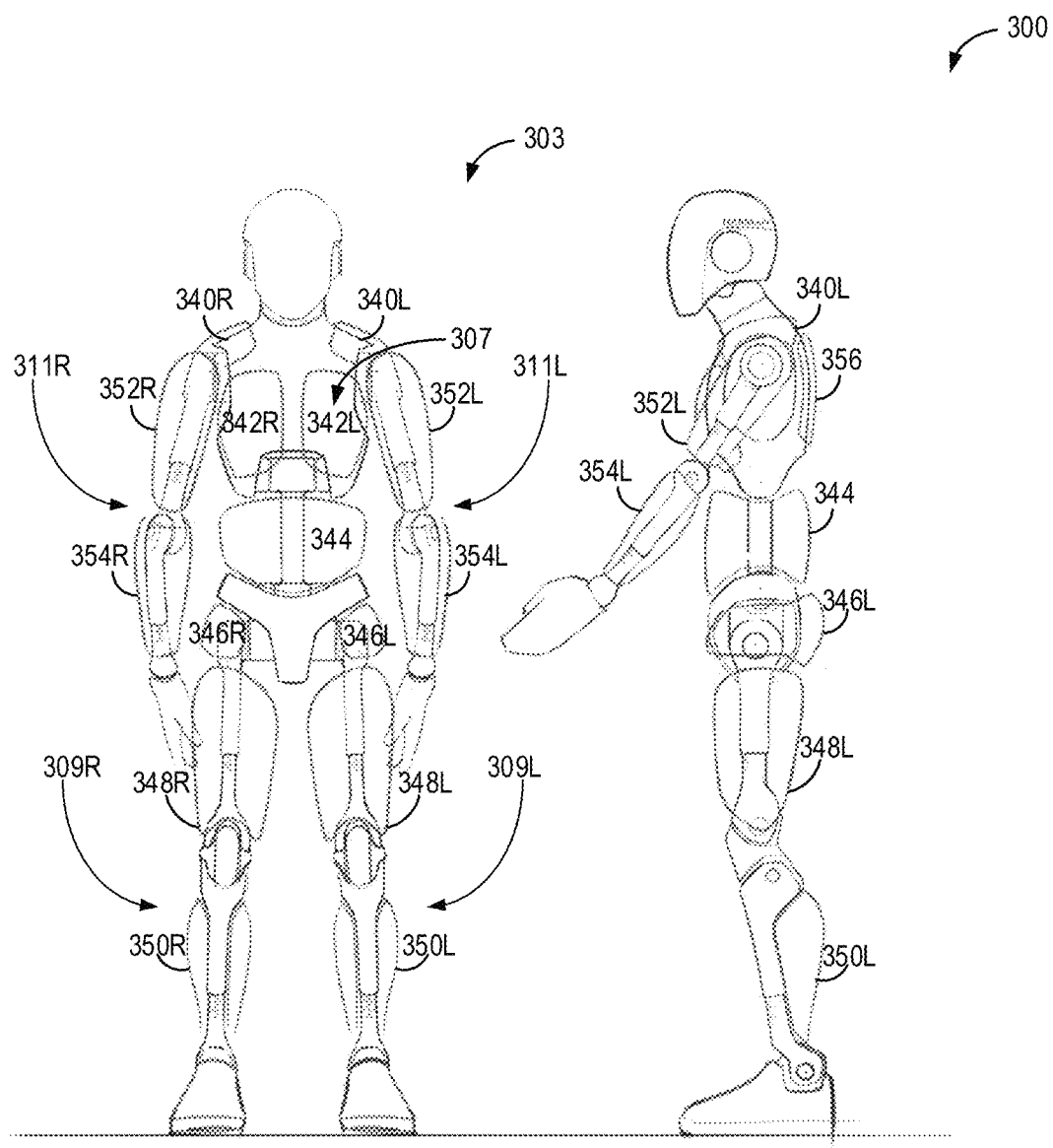
Figure 3C:
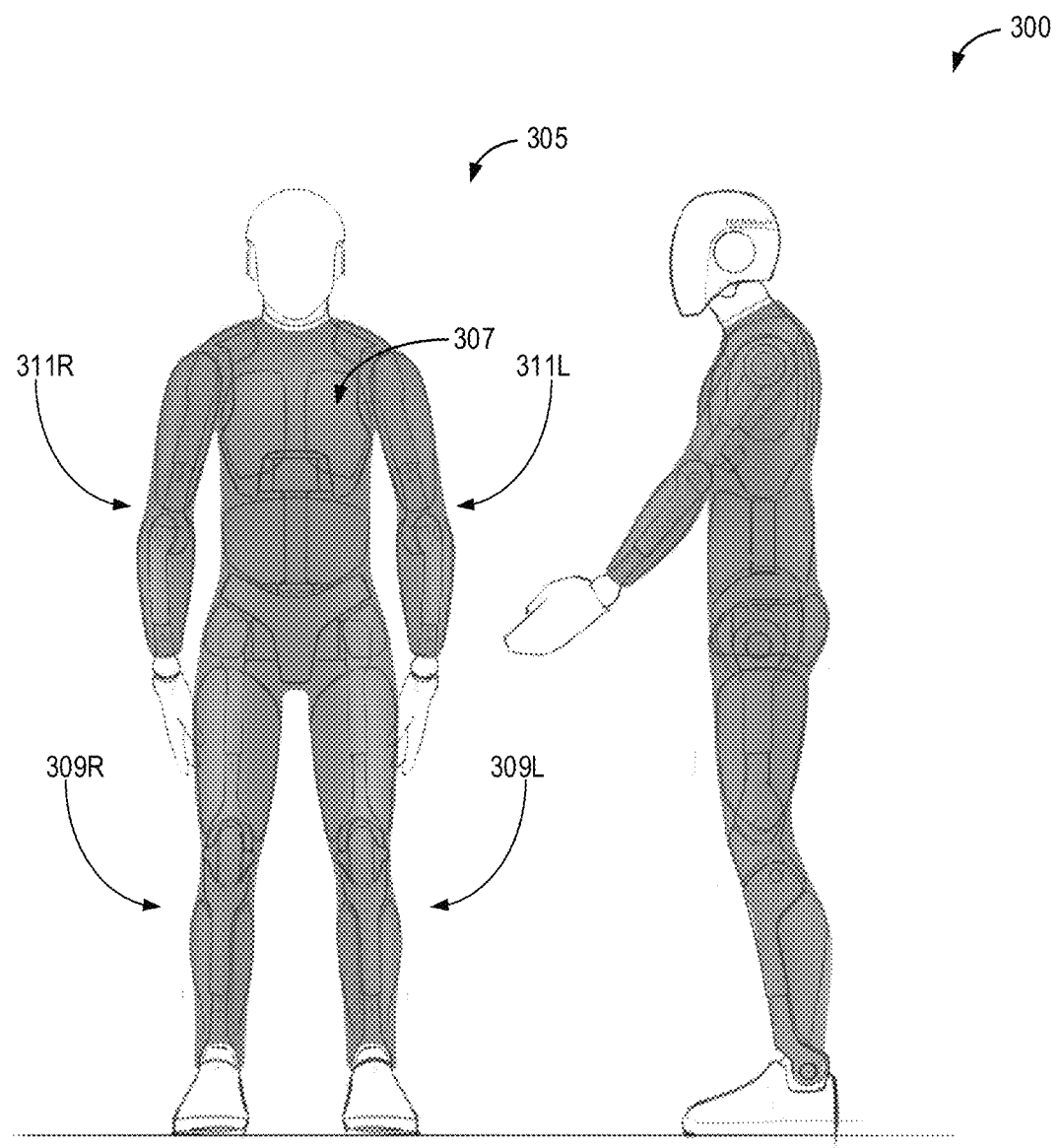

The following description relates to a system and methods for collecting automated acoustical measurements via an inflatable and configurable mannequin to aid with sound field design in an interior of a vehicle. The acoustical measurement system may include the mannequin positioned in the interior of a vehicle, such as the vehicle shown in FIG. 1. Different mannequin heads shapes and sizes may be configured by varying measurement parameters as shown in FIG. 2A and FIG. 2B. An example of the mannequin with inflatable and configurable anatomical parts is illustrated in FIG. 3A, FIG. 3B, and FIG. 3C. A mannequin profile of a plurality of mannequin profiles with various configuration components, such as mannequin head shape and size, mannequin torso size, mannequin arm size, and mannequin leg size, may be selected according to the method described in FIG. 4. As illustrated in FIG. 5, an example of a mannequin profile applied to an inflatable mannequin. An inflatable mannequin configured according to the mannequin profile may be spatially adjusted to position the inflatable mannequin in various postural configurations and subjected to testing to obtain acoustical measurements according to the method described in FIG. 6.

Figure 1:
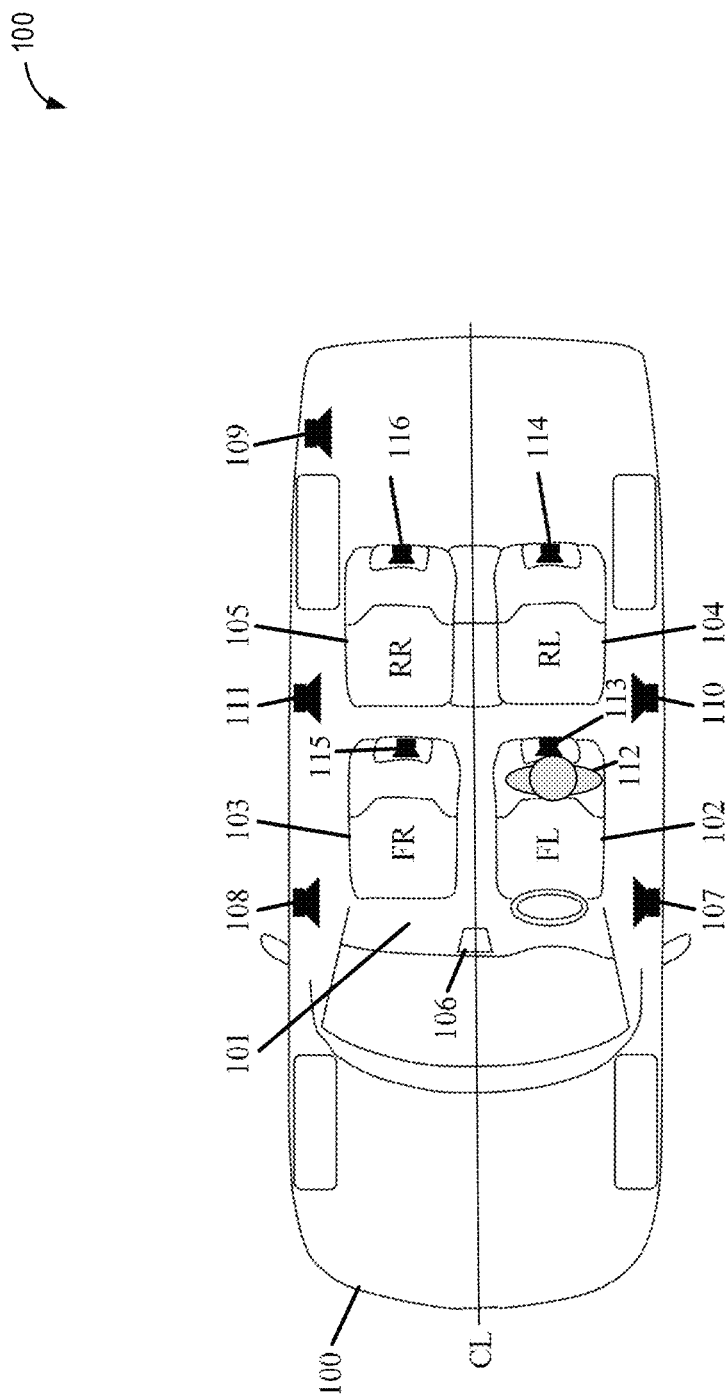
FIG. 1 systematically shows a schematic diagram of a vehicle, according to one or more embodiments of the present disclosure.

FIG. 1 illustrates a schematic diagram of a vehicle 100 according to one or more embodiments. The vehicle 100 includes a listening environment 101 or space within the vehicle 100. Inside of the listening environment 101, the vehicle 100 includes a plurality of seats. The plurality of seats at least includes a first seat 102 and a second seat 103. Beyond the first seat 102 and the second seat 103, the plurality of seats may include additional seats, such as a third seat 104 and a fourth seat 105.

In the vehicle 100, the first seat 102 may be a front left FL seat. When the vehicle 100 is a left-hand drive vehicle, the front left FL seat may be a driver seat. The second seat 103 may be a front right FR seat that is adjacent to the first seat 102. When the vehicle 100 is a left-hand drive vehicle, the front right FR seat may be a front passenger seat. The first seat 102 and the second seat 103 may be in a first row of the vehicle 100. The third seat 104 may be a rear left RL seat located behind the first seat 102. The fourth seat 105 may be a rear right RR seat located behind the second seat 103 and adjacent to the third seat 104. The third seat 104 and the fourth seat 105 may be in a second row of the vehicle 100.

The vehicle 100 may include an audio system 106 for the listening environment 101. The audio system 106 may include a plurality of loudspeakers such as woofers, tweeters, and the like. The plurality of loudspeakers may include a first loudspeaker 107, a second loudspeaker 108, and a third loudspeaker 109. Beyond the first loudspeaker 107, the second loudspeaker 108, and the third loudspeaker 109, the plurality of loudspeakers may include additional loudspeakers, such as a fourth loudspeaker 110, a fifth loudspeaker 111, a sixth loudspeaker 113, a seventh loudspeaker 114, an eighth loudspeaker 115, and a ninth loudspeaker 116.

The first loudspeaker 107 and the second loudspeaker 108 may be located in the first row of the vehicle 100. In the first row, the first loudspeaker 107 may be proximal to the first seat 102 and distal to the second seat 103, and the second loudspeaker 108 may be proximal to the second seat 103 and distal to the first seat 102.

The first loudspeaker 107 may be located in a front left door of the vehicle 100. Alternatively, the first loudspeaker 107 may be located in another area left of a center line CL of the vehicle 100. Locating the first loudspeaker 107 in another area outside of the front left door may improve an occupant's listening experience, for this may reduce unwanted structural vibrations, which may otherwise occur when the first loudspeaker 107 is placed in the front left door. As an example of placement in another area, when the vehicle 100 includes a center tunnel aligned on the center line CL, the first loudspeaker 107 may be located in the center tunnel to the left of the center line CL. As another example, the first loudspeaker 107 may be located in a firewall of the vehicle 100, where the placement is to the left of the center line CL. As another example, the first loudspeaker 107 may be located under the first seat 102. The sound field control potential is related to the spatial diversity and/or scattering in the layout of the plurality of loudspeakers. For example, loudspeakers with similar frequency ranges that are located in close proximity to one another or clustered together may reduce the potential for producing a prescribed sound field for that particular frequency range (e.g., low frequencies).

The second loudspeaker 108 may be located in a front right door of the vehicle 100. Alternatively, the second loudspeaker 108 may be located in another area right of a center line CL of the vehicle 100. Like the first loudspeaker 107, locating the second loudspeaker 108 in another area outside of the front right door may improve the occupant's listening experience, for similar reasons. As an example of placement in another area, when the vehicle 100 includes the center tunnel aligned on the center line CL, the second loudspeaker 108 may be located in the center tunnel to the right of the center line CL. As another example, the second loudspeaker 108 may be located in the firewall of the vehicle 100, where the placement is to the right of the center line CL. As another example, the second loudspeaker 108 may be located under the second seat 103.

The center line CL of the vehicle 100 may serve as a mirror line for the first loudspeaker 107 and the second loudspeaker 108. As such, the first loudspeaker 107 may mirror the second loudspeaker 108 via the center line CL. Thus the orientation of the first loudspeaker 107 may mirror the orientation of the second loudspeaker 108 via the center line CL.

In the vehicle 100, the third loudspeaker 109 may be located in the rear of the vehicle 100, such that the third loudspeaker 109 is proximal to the rear of the vehicle 100 and distal to the front of the vehicle 100. For example, when the vehicle 100 includes a rear trunk, the third loudspeaker 109 may be located therein. As another example, when the vehicle 100 includes a rear deck, the third loudspeaker 109 may be located thereon. As another example, the third loudspeaker 109 may be located behind the third seat 104 and the fourth seat 105, such as in a rear back support pan for the third seat 104 and the fourth seat 105. The third loudspeaker 109 may be located on the center line CL of the vehicle 100.

The fourth loudspeaker 110 and the fifth loudspeaker 111 may be located in the second row of the vehicle 100. In the second row, the fourth loudspeaker 110 may be proximal to the third seat 104 and distal to the fourth seat 105, and the fifth loudspeaker 111 may be proximal to the fourth seat 105 and distal to the third seat 104.

The fourth loudspeaker 110 may be located in a rear left interior wall of the vehicle 100, which may connect to a rear left quarter panel of the vehicle 100. As another example, the fourth loudspeaker 110 may be located in a rear left door of the vehicle 100. As another example, the fourth loudspeaker 110 may be located under the third seat 104. As another example, the fourth loudspeaker may be located in another area to the left of the center line CL. Like the first loudspeaker 107, locating the fourth loudspeaker 110 in another area outside of the rear left door may improve the occupant's listening experience, for similar reasons.

The fifth loudspeaker 111 may be located in a rear right interior wall of the vehicle 100, which may connect to a rear right quarter panel of the vehicle 100. As another example, the fifth loudspeaker 111 may be located in a rear right door of the vehicle 100. As another example, the fifth loudspeaker 111 may be located under the fourth seat 105. As another example, the fifth loudspeaker may be located in another area to the right of the center line CL. Like the first loudspeaker 107, locating the fifth loudspeaker 111 in another area outside of the rear right door may improve the occupant's listening experience, for similar reasons.

The center line CL of the vehicle 100 may also serve as a mirror line for the fourth loudspeaker 110 and the fifth loudspeaker 111. As such, the fourth loudspeaker 110 may mirror the fifth loudspeaker 111 via the center line CL. Thus the orientation of the fourth loudspeaker 110 may mirror the orientation of the fifth loudspeaker 111 via the center line CL.

The sixth loudspeaker 113 may be located near or embedded in the headrest of the first seat 102. The seventh loudspeaker 114 may be located near or embedded in the headrest of the third seat 104. The eighth loudspeaker 115 may be located near or embedded in the headrest of the second seat 103. The ninth loudspeaker 116 may be located near or embedded in the headrest of the fourth seat 105. The sixth loudspeaker 113, the seventh loudspeaker 114, the eighth loudspeaker 115, and the ninth loudspeaker 116 may act as nearfield sound sources during sound field testing. Other embodiments of the present disclosure may include additional loudspeakers located near or embedded in headrests of the plurality of seats.

The first loudspeaker 107, second loudspeaker 108, third loudspeaker 109, the fourth loudspeaker 110, the fifth loudspeaker 111, the sixth loudspeaker 113, the seventh loudspeaker 114, the eighth loudspeaker 115, and the ninth loudspeaker 116, as well as any additional loudspeakers in the plurality of loudspeakers, may be of the same make, model, size, and thus have the same acoustical parameters, such as for frequency response, and beneficially have overlapping characteristics. In other embodiments, the first loudspeaker 107, second loudspeaker 108, third loudspeaker 109, the fourth loudspeaker 110, the fifth loudspeaker 111, the sixth loudspeaker 113, the seventh loudspeaker 114, the eighth loudspeaker 115, and the ninth loudspeaker 116, as well as any additional loudspeakers in the plurality of loudspeakers, may be of different make, model, size, and thus have different acoustical parameters, such as for frequency response. Each loudspeaker in the plurality of loudspeakers may output sound ranging from 20 Hz to 20 kHz into the listening environment 101. In the audio system 106, each loudspeaker of the plurality of loudspeakers may be assigned its own filter.

For example, in the audio system 106, a first finite impulse response FIR filter may be assigned to the first loudspeaker 107, a second finite impulse response FIR filter may be assigned to the second loudspeaker 108, a third finite impulse response FIR filter may be assigned to the third loudspeaker 109, a fourth finite impulse response FIR filter may be assigned to the fourth loudspeaker 110, a fifth finite impulse response FIR filter may be assigned to the fifth loudspeaker 111, a sixth finite impulse response FIR filter may be assigned to the sixth loudspeaker 113, a seventh finite impulse response FIR filter may be assigned to the seventh loudspeaker 114, an eighth finite impulse response FIR filter may be assigned to the eighth loudspeaker 115, and a ninth finite impulse response FIR filter may be assigned to the ninth loudspeaker 116. It may be understood that additional or alternative audio signal filters may be assigned to the plurality of loudspeakers described herein.

As described above, the audio system 106 may operate over a frequency range of 20 Hz to 20 kHz. To do so, the audio system 106 may include a plurality of transducers such as low frequency transducers, mid-frequency transducers, and high frequency transducers. As one example, at least one of the plurality of loudspeakers may be a woofer that outputs a low-frequency range (e.g., 20 Hz to 200 Hz) portion of the overall sound output with a low-frequency transducer. In another example, at least one of the plurality of loudspeakers may be a tweeter that outputs a high frequency range portion of the overall sound output with a high-frequency transducer.

The audio system 106 may include frequency crossovers. At a low frequency crossover, there may be a seamless transition from the operation of the woofers to the operation of the mid-frequency transducers in mid-range loudspeakers and the operation of high-frequency transducers in tweeters. In particular, the low frequency crossover may be configured to split an incoming audio signal into multiple frequency ranges (e.g., at least a first frequency range and a second frequency range). A signal corresponding to a first frequency range of the incoming audio signal may be directed to woofers in the plurality of loudspeakers in the audio system 106, and a signal corresponding to the second frequency range of the incoming audio signal may be directed to at least one of the one or more mid- and high-frequency transducers. The low frequency crossover may be set within the operation range of the plurality of woofers (e.g., at a point between 20 Hz to 200 Hz). Using the above example, the first frequency range may be within the operation range of the plurality of woofers, and the second frequency range may be within an operation range of at least one of the plurality of non-woofer loudspeakers (e.g., the mid-frequency transducers). The low frequency crossover and/or another crossover circuit may be configured to further split the incoming audio signal and to direct a signal corresponding to a third frequency range of the incoming audio signal to another one or more of the plurality of non-woofer transducers (e.g., the high frequency transducers). In this way, one or more crossovers may be used to split incoming audio and direct different frequency ranges of the incoming audio to associated transducers based on the operating ranges of the transducers.

The audio system 106 may include a user interface. The user interface may be a display. The display may be a touch-screen display. The display may be located in a center-stack of the vehicle 100. Additionally or alternatively, the user interface may include an input hardware element, such as an input switch. The user interface may be electrically connected to a controller of the audio system 106. The controller may include a digital signal processor DSP with a static or adaptive algorithm solution, a graphic processing unit GPU, a system-on-a-chip SOC, and/or another integrated circuit IC. For example, the controller may include frequency impulse response (FIR) control filters and/or adaptive algorithm controls that alter or re-calculate the FIR control filters according to inputs and/or parameters quantified via transducers in or outside of the listening space (e.g., ambient conditions). The controller may be electrically connected to a tuner of the audio system 106, such as an AM tuner or an FM tuner. The controller may be electrically connected to a satellite radio antenna of the audio system 106. The controller may be electrically connected to a wireless antenna of the audio system 106, such as a Bluetooth antenna, a Wi-Fi antenna, or a Wi-Fi Direct antenna.

In the audio system 106, the controller may be electrically connected to a cellular antenna, a telematics control unit TCU, and/or a GPS antenna. The controller may be electrically connected to a memory device, such as random access memory RAM, read only memory ROM, electrically programmable read only memory EPROM, electrically erasable read only memory EEROM, FLASH, a hard disk drive HDD, and/or a solid state drive SDD, of the audio system 106. Software may be stored in the memory device and accessible and executable by the controller. The filters assigned to the plurality of loudspeakers may be stored in the memory device. The controller may be electrically connected to one or more input ports, one or more output ports, and/or one or more input/output I/O ports of the audio system 106. A portable device, such as a smartphone, may communicate with the audio system via the one or more input/output I/O ports, input ports, and/or wireless antenna. The audio system 106 may be electrically connected to a power source, such as a DC battery. The controller may be electrically connected to one or more microphones in the audio system 106. The audio system 106 may include an amplifier. The amplifier may be electrically connected to the controller. The audio system 106 may include analog-to-digital converters ADC, digital-to-analog converters DAC, additional filters in software, physical hardware filters, additional audio components, and/or additional hardware components.

In the vehicle 100, the listening environment 101 with the plurality of loudspeakers and appropriate filters may yield a prescribed sound field. In the prescribed sound field, an occupant may perceive the same listening experience across all frequencies at each seat in the plurality of seats. As such, if the occupant moves from the first seat 102 to the fourth seat 105, the occupant may perceive the same listening experience across all frequencies at the fourth seat 105 as they did in the first seat 102. The invariable perception via the prescribed sound field may be a desirable user experience, such as for a default listening experience of the audio system 106. In this way, the occupant may choose any seat without concern as to whether one seat has a different low frequency listening experience than another. As such, the low frequency listening experience is essentially optimized at each seat in the plurality of seats in the listening environment 101. For example, a loudness of audio output in the listening environment 101 may be substantially the same at each seat in the plurality of seats in the listening environment, and thus, the loudness of the audio output in the listening environment may not vary across the listening environment.

In the vehicle 100, the plurality of loudspeakers and the filters assigned thereto may yield the prescribed sound field. This may be due to the arrangement of the plurality of loudspeakers in the vehicle 100 and the values set for the filters assigned to the plurality of loudspeakers. To create the prescribed sound field, at least the first loudspeaker 107, the second loudspeaker 108, and the third loudspeaker 109 may be needed. Additionally, the fourth loudspeaker 110, the fifth loudspeaker 111, the sixth loudspeaker 113, the seventh loudspeaker 114, the eighth loudspeaker 115, and the ninth loudspeaker 116 may be needed. Moreover, the first finite impulse response FIR filter, the second finite impulse response FIR filter, and the third finite impulse response FIR filter may be needed to create the prescribed sound field. Additionally, in the vehicle 100, when the fourth loudspeaker 110, the fifth loudspeaker 111, the sixth loudspeaker 113, the seventh loudspeaker 114, the eighth loudspeaker 115, and the ninth loudspeaker 116 are included, the fourth finite impulse response FIR filter, the fifth finite impulse response FIR filter, the sixth finite impulse response FIR filter, the seventh finite impulse response FIR filter, the eighth finite impulse response FIR filter, and the ninth finite impulse response FIR filter may be needed to create the prescribed sound field.

In the audio system 106, the controller may receive a source signal from an audio source. The audio source may be part of the audio system 106, such as an audio file stored in the memory device of the audio system 106. Alternatively, the audio source may be external to but in communication with the audio system 106, such as a portable device in communication with the audio system via the wireless antenna and having an audio file that may be played-back on the audio system because of the communication therewith. The source signal may be a digital source signal or an analog source signal. When the source signal is the analog source signal, an analog-to-digital converter ADC may convert the analog source signal to a digital source signal. The conversion from analog to digital may occur before reaching the controller or within the controller itself. The latter may occur when the analog-to-digital converter is included in the controller.

The controller may analyze and condition the source signal. As part of the analysis and conditioning, the controller may separate a bass signal from one or more other frequency signals, such as for a stereo left, a stereo right, a center speaker, another speaker in a multichannel system. The bass signal may be a mono signal. The mono signal may be a stereo left signal combined with a stereo right signal. The mono signal may be attributable to a certain frequency range, such as a low frequency range from 20 Hz to 200 Hz.

The controller may send the bass signal (e.g., a low-frequency signal) down the signal path of each woofer in the plurality of loudspeakers. Each signal path includes its own filter. In a signal path, the filter may be the finite impulse response FIR filter assigned to the particular woofer in the plurality of loudspeakers. The finite impulse response FIR filter of the signal path may filter a common bass signal. The filtered bass signal may be sent to a digital-to-analog converter DAC. The filtered bass signal may be converted from digital to analog. The analog filtered bass signal may be amplified in an amplifier. The amplified analog filtered bass signal may drive the particular woofer in the plurality of loudspeaker. In doing so, the particular woofer may output low frequency sound into the listening environment 101.

The controller may send one or more signals covering other parts of the audio spectrum to one or more of the transducers in the plurality of non-woofer loudspeakers. Unlike the bass signals, the one or more other frequency signals may be suited for providing a suitable audio experience by reproducing the whole audible audio spectrum. Therefore, unlike the plurality of woofers, the signals sent from the controller to the plurality of non-woofer transducers may not be the same. For example, if the plurality of non-woofer transducers is setup for 5.1-multichannel surround sound, then, beyond the bass signals, the controller may send out a front left signal, a center signal, a front right signal, a surround left signal, and a surround right signal. The front left signal may be sent to one or more signal paths for a first subset of the non-woofer transducers, the center signal may be sent to one or more signal paths for a second subset of the non-woofer transducers, the front right signal may be sent to one or more signal paths for a third subset of the non-woofer transducers, the surround left may be sent to one or more signal paths for a fourth subset of the non-woofer transducers, and the surround right may be sent to one or more signals for a fifth subset of the non-woofer transducers. Each subset of the non-woofer transducers may be mutually exclusive or independent of one another. Each signal path of the non-woofer transducers may include a filter, a time-delay, a digital-to-analog converter DAC, and an amplifier.

As another example, the non-woofer transducers may be in a stereo setup. In the stereo setup, beyond the bass signal, the controller may send out a stereo left signal and a stereo right signal. The stereo left signal may be sent to one or more signal paths for a first subset of the non-woofer transducers, and the stereo right signal may be sent to one or more signal paths for a second subset of the non-woofer transducers. Each subset of the non-woofer transducers may again be mutually exclusive or independent of one another. Other setups outside of the 5.1-multichannel surround sound setup and the stereo setup may be possible for the non-woofer transducers. The sound system in the vehicle 100 may provide the prescribed low frequency sound field, a mid-frequency sound field, and/or a high-frequency sound field.

Additionally, the vehicle 100 may include an inflatable mannequin 112 positioned in the first seat 102 (e.g., the seat of the operator) of an interior of the vehicle 100. In other embodiments, the inflatable mannequin 112 may be positioned in other seats in the interior of the vehicle, such as the third seat 104 (e.g., the seat of the occupant). The inflatable mannequin 112 may comprise inflatable anatomical parts, including one or more or each of inflatable mannequin arms, inflatable mannequin legs, and an inflatable mannequin torso. One or more of the inflatable anatomical parts may comprise drop-stitching in an interior volume of the inflatable anatomical part to increase rigidity. Further, the drop-stitching may provide a more contoured outer surface to mimic a realistic shape of the anatomical part.

The inflatable mannequin 112 may further comprise configurable joints that are adjusted to attain different postural configurations of the inflatable mannequin. FIG. 2A, FIG. 2B, FIG. 3A, FIG. 3B, and FIG. 3C further illustrate the various components of the inflatable mannequin 112. Inflating the inflatable mannequin 112 and adjusting the postural configuration of the inflatable mannequin 112 while conducting acoustical measurements may aid with sound field design in the vehicle 100. As such, the filters described above may be adjusted or different filters may be applied to the plurality of loudspeakers based on the acoustical measurements collected. In this way, the sound field may be adjusted to construct a wider sweet spot and increase the listening experience of the occupant.

Measurement parameters that define the shape and size of the detachable mannequin head (e.g., the inflatable mannequin 112 of FIG. 1) are shown from a profile view in FIG. 2A and from a frontal view in FIG. 2B. The measurement parameters are based on anatomical measurements of different regions of the detachable mannequin head. Varying the measurement parameters may enable different shapes and sizes of the head and the ears to be subjected to acoustical testing for sound field design. In this way, information regarding how sound impinges toward the mannequin head may be obtained, and sound signals received by microphones embedded in the ear region may be used to develop audio processing schemes.

The profile view 200, profile view 201, and profile view 202 shown in FIG. 2A and the frontal views 204 and 205 shown in FIG. 2B may comprise a detachable mannequin head 206 with microphone insert 208a and microphone insert 208b positioned in the ear region. In one example of the embodiment, the detachable mannequin head 206 may comprise uniform cavities (e.g., canals) positioned in the ear region with a pre-determined diameter threshold (e.g., holes with a diameter of 1.1 to 1.3 inches) for the cavities. In another example, the detachable mannequin head 206 may comprise cavities positioned in the ear region that may vary in diameter based on the horizontal depth of the cavities inside the detachable mannequin head 206. Other embodiments may include multiple cavities constructed with different depths and oriented in space to simulate the ear and the ear canal. The diameter threshold that may configure the microphone insert 208a and the microphone insert 208b may be an additional measurement parameter in some embodiments of the present disclosure. In other examples of the present disclosure, the microphone insert 208a and the microphone insert 208b may be configured to a plurality of diameter thresholds. In this way, different pinna sizes of the ear and overall ear sizes may be subjected to sound field testing for acoustical measurements.

The microphone insert 208a and microphone insert 208b may comprise a foam insert (e.g., made of polyurethane and the like) placed inside the cavities described above. As such, the foam insert may position a microphone, cushion the microphone, and protect the microphone from being damaged. Microphones may be embedded in the ear region via the microphone insert 208a and microphone insert 208b for acoustical measurement tests. In other embodiments, the microphones may be located at other positions inside the detachable mannequin head 206, on the detachable mannequin head 206, and on or near other anatomical parts of the inflatable mannequin. Further embodiments of the present disclosure may include synthetic hair of various lengths attached to the detachable mannequin head 206.

Turning to FIG. 2A, the profile view 200, profile view 201, and profile view 202 may further include a plurality of measurement parameters. The plurality of measurement parameters may include a first measurement parameter 210, a second measurement parameter 212, and a third measurement parameter 214. As such, the plurality of measurements parameters may be defined by a non-zero, positive value threshold. The first measurement parameter 210 may depict the circumference of the detachable mannequin head 206. In one example, the circumference threshold may be based on average head circumferences (e.g., in inches) of adult men and women. In particular, the circumference threshold may range from 19 inches to 24 inches. In another example, the circumference threshold may include average values for adolescents and children. The second measurement parameter 212 may depict the horizontal distance between the anterior and posterior sides of the detachable mannequin head 206. By calibrating the detachable mannequin head 206 with the second measurement parameter 212, a width of the detachable mannequin head may be varied. The width threshold range may range from 5.5 inches to 7.5 inches as one example. The third measurement parameter 214 may depict the arc length of the detachable mannequin head 206 from the top of the forehead to the nape of the neck. Like the measurement parameters described above, the third measurement parameter 214 may also have an associated arc length threshold. For example, the arc length threshold may be based on average measurements for adults, adolescents, and children.

The frontal views 204 and 205 illustrated in FIG. 2B may further include the measurement parameters depicted in FIG. 2B. As such, the plurality of measurements may further include a fourth measurement parameter 216 and a fifth measurement parameter 218. The fourth measurement parameter 216 may depict the vertical length from the top of the detachable mannequin head 206 to the bottom of the detachable mannequin head 206. As one example, the fourth measurement parameter 216 threshold may range from 7 inches to 10 inches. The fifth measurement parameter 218 may depict the horizontal distance between the left side and right side of the detachable mannequin head 206.

Collectively, various widths, lengths, circumferences, and overall head shapes and profiles of the detachable mannequin head 206 may be encompassed during sound field testing by varying the measurement parameters discussed above. It may be understood that the present disclosure is illustrative rather than absolute. Other embodiments of the present disclosure may utilize additional measurement parameters to calibrate the detachable mannequin head 206 for acoustical measurements. For example, various ear sizes or pinna sizes of the ear of the detachable mannequin head 206 may be encompassed with additional measurement parameters due to the importance of ear size for receiving and processing sound. In fact, ear size may have a larger effect on receiving and processing sound in comparison to overall head shape and size.

As shown in FIG. 3A, FIG. 3B, and FIG. 3C, an example of an inflatable mannequin 300 and various components of the inflatable mannequin 300 that may be utilized to conduct acoustical measurements in an interior of a vehicle (e.g., vehicle 100 in FIG. 1). The inflatable mannequin 300 may comprise a mannequin skeleton 301 as illustrated in FIG. 3A, a plurality of inflation compartments 303 as illustrated in FIG. 3B, and a synthetic skin overlay 305 as illustrated in FIG. 3C. The inflatable mannequin 300 may further comprise a detachable mannequin head 302 and a plurality of inflatable anatomical parts, such as an inflatable mannequin torso 307, a right inflatable mannequin leg 309R, a left inflatable mannequin leg 309L, a right inflatable mannequin arm 311R, and a left inflatable mannequin arm 311L.

Turning to FIG. 3A, the plurality of inflatable anatomical parts may comprise the mannequin skeleton 301. The mannequin skeleton 301 includes a plurality of mannequin skeleton parts, such as an extendable mannequin skeleton torso, extendable mannequin skeleton arms, and extendable mannequin skeleton legs, wherein a mannequin skeleton part in the plurality of mannequin skeleton parts is the smallest size configuration for an inflatable anatomical part.

The detachable mannequin head 302 may comprise a first microphone 304L embedded in a left ear region and a second microphone 304R embedded in a right ear region. The detachable mannequin head 304 may be configured according to FIG. 2A and FIG. 2B. The mannequin skeleton 301 of the inflatable mannequin torso 307 may comprise an extendable mannequin skeleton torso that includes an upper mannequin skeleton torso 306 and a lower extendable mannequin skeleton spine 308. The extendable mannequin skeleton torso may be considered the smallest size configuration for the inflatable mannequin torso 307. The upper mannequin skeleton torso 306 may simulate an upper torso of an occupant (e.g. a chest and back) whereas the lower extendable mannequin skeleton spine 308 may simulate a lower spine (e.g. lower torso or abdominal region of an occupant). In some embodiments, a length of the lower extendable mannequin skeleton spine 308 may be increased or decreased to adjust the length of the inflatable mannequin torso 307, which may increase an overall height of the inflatable mannequin 300. In other embodiments of the present disclosure, the lower extendable mannequin skeleton spine 308 of the inflatable mannequin 300 may not be configured to be extendable and may remain at a default length.

The mannequin skeleton 301 may include extendable mannequin skeleton legs joined via a mannequin skeleton pelvis 310. For example, the extendable mannequin skeleton legs may comprise an extendable left mannequin skeleton leg for the left inflatable mannequin leg 309L that may include a first extendable left mannequin skeleton leg 312L and a second extendable left mannequin skeleton leg 314L. The extendable mannequin skeleton legs may further comprise an extendable right mannequin skeleton leg for the right inflatable mannequin leg 309R that may include a first extendable right mannequin skeleton leg 312R, and a second extendable right mannequin skeleton leg 314R. The extendable mannequin skeleton legs may be considered the smallest size configuration for the left inflatable mannequin leg 309L and the right inflatable mannequin leg 309R. The first extendable left mannequin skeleton leg 312L and the first extendable right mannequin skeleton leg 312R may simulate an upper leg and hip of the occupant. The second extendable left mannequin skeleton leg 314L and the second extendable right mannequin skeleton leg 314R may simulate a lower leg and an ankle of the occupant.

In some embodiments, lengths of the first extendable left mannequin skeleton leg 312L, the second extendable left mannequin skeleton leg 314L, the first extendable right mannequin skeleton leg 312R, and the second extendable right mannequin skeleton leg 314R may be increased or decreased to adjust the length of the left inflatable mannequin leg 309L and the right inflatable mannequin leg 309R, which may increase the overall height of the inflatable mannequin 300. In other embodiments of the present disclosure, the first extendable left mannequin skeleton leg 312L, the second extendable left mannequin skeleton leg 314L, the first extendable right mannequin skeleton leg 312R, and the second extendable right mannequin skeleton leg 314R may not be configured to be extendable and may remain at default lengths.

The mannequin skeleton 301 may include extendable mannequin skeleton arms. For example, the extendable mannequin skeleton arms may comprise an extendable left mannequin skeleton arm for the left inflatable mannequin arm 311L that may include a first extendable left mannequin skeleton arm 316L and a second extendable left mannequin skeleton arm 318L. The extendable mannequin skeleton arms may further comprise an extendable right mannequin skeleton arm for the right inflatable mannequin arm 311R that may include a first extendable right mannequin skeleton arm 316R, and a second extendable right mannequin skeleton arm 318R. The extendable mannequin skeleton arms may be considered the smallest size configuration for the left inflatable mannequin arm 311L and the right inflatable mannequin arm 311R. The first extendable left mannequin skeleton arm 316L and the first extendable right mannequin skeleton arm 316R may simulate an upper arm and shoulder of the occupant. The second extendable left mannequin skeleton arm 318L and the second extendable right mannequin skeleton arm 318R may simulate a lower arm and a wrist of the occupant.

In some embodiments, lengths of the first extendable left mannequin skeleton arm 316L, the second extendable left mannequin skeleton arm 318L, the first extendable right mannequin skeleton arm 316R, and the second extendable right mannequin skeleton arm 318R may be increased or decreased to adjust the length of the left inflatable mannequin arm 311L and the right inflatable mannequin arm 311R, which may increase the overall arm span of the inflatable mannequin 300. In other embodiments of the present disclosure, the first extendable left mannequin skeleton arm 316L, the second extendable left mannequin skeleton arm 318L, the first extendable right mannequin skeleton arm 316R, and the second extendable right mannequin skeleton arm 318R may not be configured to be extendable and may remain at default lengths.

The inflatable mannequin 300 may further comprise a plurality of configurable joints. The plurality of configurable joints may be motorized, and therefore, may be calibrated and controlled by an electronic control system, such as a joint control system. The plurality of configurable joints may be adjusted via the joint motors to position a system (e.g. the inflatable mannequin) in a plurality of postures based on a postural configuration adjustment sequence. In particular, adjusting the postural configuration of the inflatable mannequin may be based on set point positions and feedback from encoders on the plurality of configurable joints. As a result, adjusting the postural configuration may include adjusting motors at joints of the inflatable mannequin responsive to a desired position of the inflatable mannequin.

In one embodiment of the present disclosure, a first configurable joint 320L may be located near a left side of an inflatable mannequin neck, a second configurable joint 320R may be located near a right side of the inflatable mannequin neck, a third configurable joint 322 may be located near the top of an inflatable mannequin rib cage, a fourth configurable joint 324 may be located near the top of an inflatable mannequin pelvis, a fifth configurable joint 326L may be located near a left inflatable mannequin hip, a sixth configurable joint 326R may be located near a right inflatable mannequin hip, a seventh configurable joint 328L may be located near the top of a left inflatable mannequin kneecap, an eighth configurable joint 328R may be located near the top of a right inflatable mannequin kneecap, a ninth configurable joint 330L may be located near the bottom of the left inflatable mannequin kneecap, a tenth configurable joint 330R may be located near the bottom of the right inflatable mannequin kneecap, an eleventh configurable joint 332L may be located near a left inflatable mannequin ankle, a twelfth configurable joint 332R may be located near a right inflatable mannequin ankle, a thirteenth configurable joint 334L may be located near a left inflatable mannequin shoulder, a fourteenth configurable joint 334R may be located near a right inflatable mannequin shoulder, a fifteenth configurable joint 336L may be located near a left inflatable mannequin elbow, a sixteenth configurable joint 336R may be located near a right inflatable mannequin elbow, a seventeenth configurable joint 338L may be located near a left inflatable mannequin wrist, and an eighteenth configurable joint 338R may be located near a right inflatable mannequin wrist.

The first configurable joint 320L and the second configurable joint 320R may adjust the position of the detachable mannequin head 302 relative to various anatomical parts of the inflatable mannequin 300. The third configurable joint 322 may adjust the position of an upper portion of the inflatable mannequin torso 307 relative to other various anatomical parts of the inflatable mannequin 300. The fourth configurable joint 324 may adjust the position of a lower portion of the inflatable mannequin torso 307 relative to other various anatomical parts of the inflatable mannequin 300. The fifth configurable joint 326L may adjust the position of the left inflatable mannequin hip relative to other various anatomical parts of the inflatable mannequin 300. The sixth configurable joint 326R may adjust the position of the right inflatable mannequin hip relative to other various anatomical parts of the inflatable mannequin 300. The seventh configurable joint 328L may adjust the position of the left inflatable mannequin kneecap relative to other various anatomical parts of the inflatable mannequin 300. The eighth configurable joint 328R may adjust the position of the right inflatable mannequin kneecap relative to other various anatomical parts of the inflatable mannequin 300.

The ninth configurable joint 330L may adjust the position of the left inflatable mannequin kneecap relative to other various anatomical parts of the inflatable mannequin 300. The tenth configurable joint 330R may adjust the position of the right inflatable mannequin kneecap relative to other various anatomical parts of the inflatable mannequin 300. The eleventh configurable joint 332L may adjust the position of the left inflatable mannequin ankle relative to other various anatomical parts of the inflatable mannequin 300. The twelfth configurable joint 332R may adjust the position of the right inflatable mannequin ankle relative to other various anatomical parts of the inflatable mannequin 300. The thirteenth configurable joint 334L may adjust the position of the left inflatable mannequin shoulder relative to other various anatomical parts of the inflatable mannequin 300. The fourteenth configurable joint 334R may adjust the position of the right inflatable mannequin shoulder relative to other various anatomical parts of the inflatable mannequin 300.

The fifteenth configurable joint 336L may adjust the position of the left inflatable mannequin elbow relative to other various anatomical parts of the inflatable mannequin 300. The sixteenth configurable joint 336R may adjust the position of the right inflatable mannequin elbow relative to other various anatomical parts of the inflatable mannequin 300. The seventeenth configurable joint 338L may adjust the position of the left inflatable mannequin wrist relative to other various anatomical parts of the inflatable mannequin 300. The eighteenth configurable joint 338R may adjust the position of the right inflatable mannequin wrist relative to other various anatomical parts of the inflatable mannequin 300.

Now referring to FIG. 3B, the inflatable mannequin 300 may include the plurality of inflation compartments 303. Air may be stored in the plurality of inflation compartments 303 to increase the size of the plurality of inflatable anatomical parts. The plurality of inflation compartments 303 may be calibrated and inflated by an inflation system.

In some embodiments, the inflatable mannequin torso 307 may include a first mannequin torso inflation compartment 342L, a second mannequin torso inflation compartment 342R, a third mannequin torso inflation compartment 356, and a fourth mannequin torso inflation compartment 344. The first mannequin torso inflation compartment 342L may envelop an upper left ventral portion of the upper mannequin skeleton torso 306 (e.g., a left side of an inflatable mannequin chest). The second mannequin torso inflation compartment 342R may envelop an upper right ventral portion of the upper mannequin skeleton torso 306 (e.g., a right side of an inflatable mannequin chest). The third mannequin torso inflation compartment 356 may envelop a dorsal portion of the upper mannequin skeleton torso 306 (e.g., an inflatable mannequin back), and the fourth mannequin torso inflation compartment 344 may envelop the lower extendable mannequin skeleton spine 308 (e.g., an inflatable mannequin stomach and abdominal region).

In this way, the first mannequin torso inflation compartment 342L may increase the size of the left side of the inflatable mannequin chest, the second mannequin torso inflation compartment 342R may increase the right side of the inflatable mannequin chest, the third mannequin torso inflation compartment 356 may increase the size of the inflatable mannequin back, and the fourth mannequin torso inflation compartment 344 may increase the size of the inflatable mannequin stomach and abdominal region. Other embodiments of the present disclosure may include less or additional mannequin skeleton parts or inflation compartments for the inflatable mannequin torso 307.

The left inflatable mannequin leg 309L may comprise a first left mannequin leg inflation compartment 348L, a second left mannequin leg inflation compartment 350L, and third left mannequin leg inflation compartment 346L whereas the right inflatable mannequin leg 309R may comprise a first right mannequin leg inflation compartment 348R, a second right mannequin leg inflation compartment 350R, and a third right mannequin leg inflation compartment 346R. The first left mannequin leg inflation compartment 348L may envelop the first extendable left mannequin skeleton leg 312L (e.g. an upper left inflatable mannequin leg).

The second left mannequin leg inflation compartment 350L may envelop the second extendable left mannequin skeleton leg 314L (e.g. a lower left inflatable mannequin leg). The third left mannequin leg inflation compartment 346L may envelop an upper ventral and dorsal portion of the first extendable left mannequin skeleton leg 312L (e.g. a left inflatable mannequin hip and gluteal muscles). The first right mannequin leg inflation compartment 348R may envelop the first extendable right mannequin skeleton leg 312R (e.g. an upper right inflatable mannequin leg). The second right mannequin leg inflation compartment 350R may envelop the second extendable right mannequin skeleton leg 314R (e.g. a lower right inflatable mannequin leg). The third right mannequin leg inflation compartment 346R may envelop an upper ventral and dorsal portion of the first extendable right mannequin skeleton leg 312R (e.g. a right inflatable mannequin hip and gluteal muscles).

In this way, the first left mannequin leg inflation compartment 348L may increase the size of the upper left inflatable mannequin leg, the second left mannequin leg inflation compartment 350L may increase the size of the lower left inflatable mannequin leg, and the third left mannequin leg inflation compartment 346L may increase the size of left inflatable mannequin hip and gluteal muscles. Additionally, the first right mannequin leg inflation compartment 348R may increase the size of the upper right inflatable mannequin leg, the second right mannequin leg inflation compartment 350R may increase the size of the lower right inflatable mannequin leg, and the third right mannequin leg inflation compartment 346R may increase the size of right inflatable mannequin hip and gluteal muscles.

Other embodiments of the present disclosure may include less mannequin skeleton parts and inflation compartments for the inflatable mannequin legs. For example, the left inflatable mannequin leg 309L may include a single left mannequin leg inflation compartment that envelops the plurality of mannequin skeleton parts (e.g., the first extendable left mannequin skeleton leg 312L and a second extendable left mannequin skeleton leg 314L). In this way, the single left mannequin leg inflation compartment may increase the size of the upper left inflatable mannequin leg and the lower left inflatable mannequin leg. Similarly, the right inflatable mannequin leg 309R may include a single right mannequin leg inflation compartment that envelops the plurality of mannequin skeleton parts (e.g., the first extendable right mannequin skeleton leg 312R and a second extendable right mannequin skeleton leg 314R). As such, the single right mannequin leg inflation compartment may increase the size of the upper right inflatable mannequin leg and the lower right inflatable mannequin leg. In contrast, other embodiments may include additional mannequin skeleton parts and inflation compartments for the mannequin legs than described herein.

The left inflatable mannequin arm 311L may comprise a first left mannequin arm inflation compartment 352L, a second left mannequin arm inflation compartment 354L, and third left mannequin arm inflation compartment 340L whereas the right inflatable mannequin arm 311R may comprise a first right mannequin arm inflation compartment 352R, a second right mannequin arm inflation compartment 354R, and a third right mannequin arm inflation compartment 340R. The first left mannequin arm inflation compartment 352L may envelop the first extendable left mannequin skeleton arm 316L (e.g. an upper left inflatable mannequin arm). The second left mannequin arm inflation compartment 354L may envelop the second extendable left mannequin skeleton arm 318L (e.g. a lower left inflatable mannequin arm). The third left mannequin arm inflation compartment 340L may envelop an upper ventral and dorsal portion of the first extendable left mannequin skeleton arm 316L (e.g. a left inflatable mannequin shoulder). The first right mannequin arm inflation compartment 352R may envelop the first extendable right mannequin skeleton arm 316R (e.g. an upper right inflatable mannequin arm). The second right mannequin arm inflation compartment 354R may envelop the second extendable right mannequin skeleton arm 318R (e.g. a lower right inflatable mannequin arm). The third right mannequin arm inflation compartment 340R may envelop an upper ventral and dorsal portion of the first extendable right mannequin skeleton arm 316R (e.g. a right inflatable mannequin shoulder).

In this way, the first left mannequin arm inflation compartment 352L may increase the size of an upper left inflatable mannequin arm, the second left mannequin arm inflation compartment 354L increase the size of a lower left inflatable mannequin arm, and the third left mannequin arm inflation compartment 340L may increase the size of a left inflatable mannequin shoulder. Additionally, the first right mannequin arm inflation compartment 352R may increase the size of an upper right inflatable mannequin arm, the second right mannequin arm inflation compartment 354R may increase the size of a lower right inflatable mannequin arm, and the third right mannequin arm inflation compartment 340R may increase the size of a right inflatable mannequin shoulder.

Other embodiments of the present disclosure may include less mannequin skeleton parts and inflation compartments for the inflatable mannequin arms. For example, the left inflatable mannequin arm 311L may include a single left mannequin arm inflation compartment that envelops the plurality of mannequin skeleton parts (e.g., the first extendable left mannequin skeleton arm 316L and a second extendable left mannequin skeleton arm 318L). In this way, the single left mannequin arm inflation compartment may increase the size of the left upper inflatable mannequin arm and the left lower inflatable mannequin arm. Similarly, the right inflatable mannequin arm 311R may include a single right mannequin arm inflation compartment that envelops the plurality of mannequin skeleton parts (e.g., the first extendable right mannequin skeleton arm 316R and a second extendable right mannequin skeleton arm 318R). As such, the single right mannequin arm inflation compartment may increase the size of the right upper inflatable mannequin arm and the right lower inflatable mannequin arm. In contrast, other embodiments may include additional base anatomical parts and inflation compartments for the mannequin arms than described herein.

Turning to FIG. 3C as shown the inflatable mannequin 300 with the synthetic skin overlay 305. The inflatable mannequin 300 with the synthetic skin overlay 305 includes the components described above with respect to FIG. 3A and FIG. 3B, including various inflatable anatomical parts, such as the inflatable mannequin torso 307, a right inflatable mannequin leg 309R, the left inflatable mannequin leg 309L, the right inflatable mannequin arm 311R, and the left inflatable mannequin arm 311L. The synthetic skin overlay 358 may be fabricated from an elastic material to allow the sizes of the plurality of inflation compartments to increase without hindering or slowing inflation of the inflatable mannequin 300.

The various anatomical parts of the inflatable mannequin and the postural configuration of the inflatable mannequin may affect how sound impinges towards the ears. In particular, different sizes of the inflatable mannequin torso 307, the left inflatable mannequin leg 309L, the right inflatable mannequin leg 309R, the left inflatable mannequin arm 311L, and the right inflatable mannequin arm 311R may alter the sound field around the ears of a listener in different ways as the sound waves travel through space in the interior of the vehicle and interact with anatomical parts of different sizes. Similarly, various postural configurations in space in the interior of a vehicle may also alter the sound field around the ears of the listener. For example, leaning forward toward the front of the vehicle may create a different sound field around the ears of the listener than leaning forward towards the back of the vehicle. In turn, this may affect the quality of sound experienced by the occupant.

Figure 4:
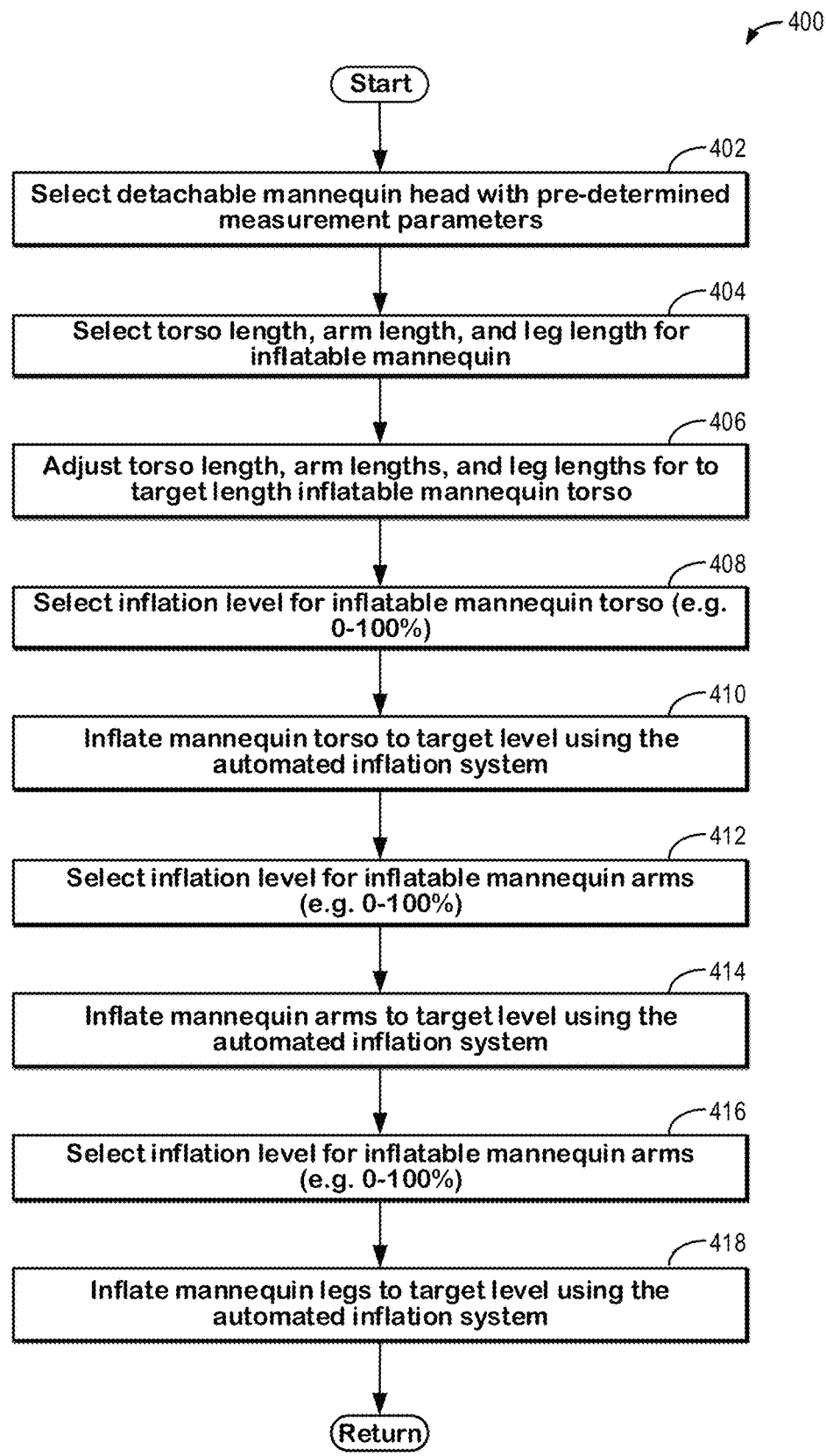
FIG. 4 shows a flow chart of a sequence for inflating various anatomical parts of an inflatable mannequin to create a mannequin profile.
Figure 5:
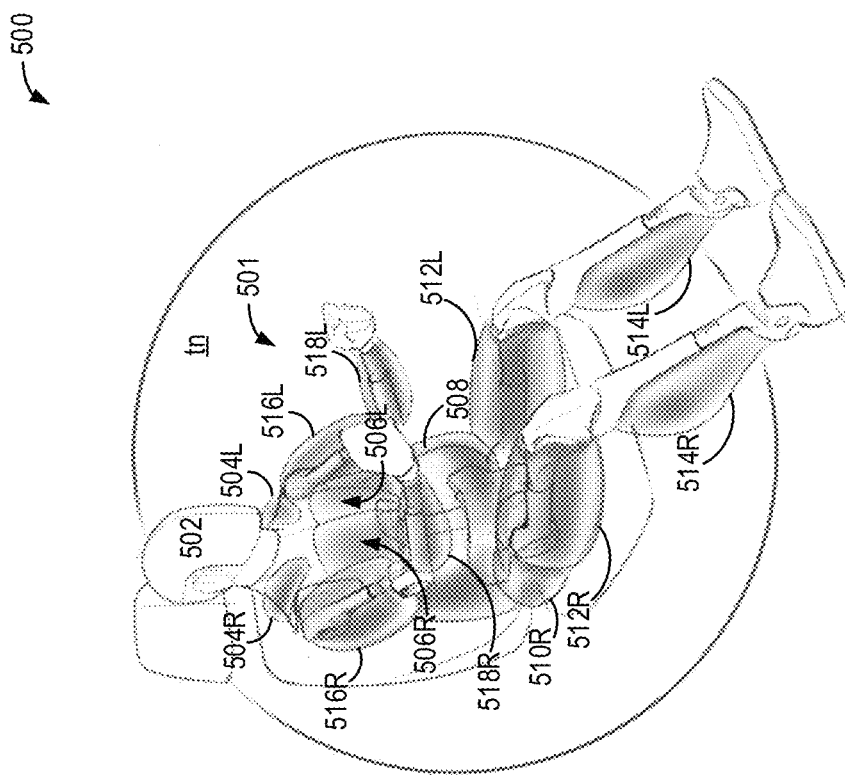
FIG. 5 shows a schematic diagram of an inflatable mannequin being configured according to a mannequin profile.
Figure 5:
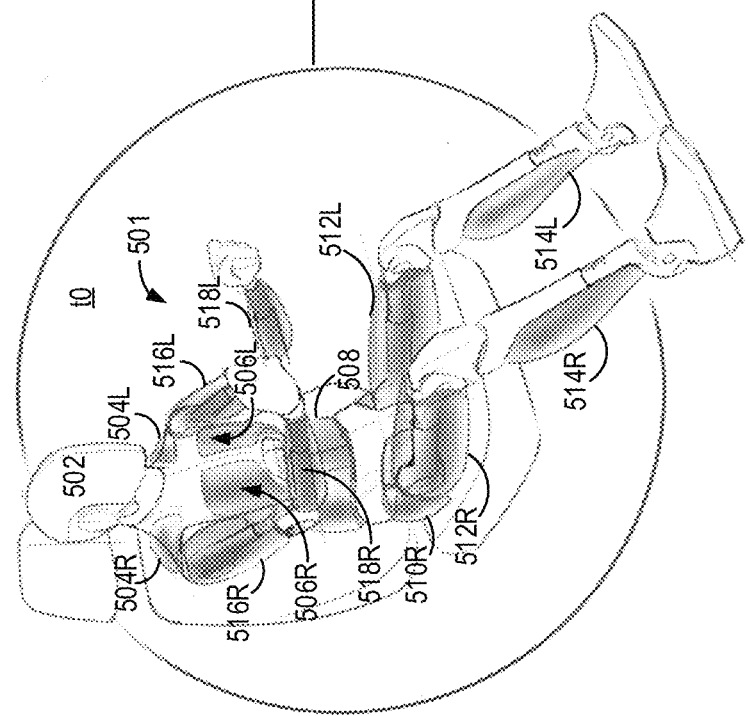

FIG. 4 provides an example method for creating a mannequin profile. The method 400 will be described with regard to the system and components shown in FIG. 2A, FIG. 2B, FIG. 3A, FIG. 3B, and FIG. 3C, although it may be understood that the method 400 may be implemented with other systems and components without departing from the scope of this disclosure. In particular, the method 400 will be described with respect to adjusting the mannequin profile to encompass different head shapes and body types for an inflatable mannequin. Different head shapes and body types may be encompassed by adjusting an inflation level or an inflation pressure level to a plurality of targets for a plurality of inflatable anatomical parts of the inflatable mannequin. In this way, the size of the sweet spot in the vehicle may be increased to increase the sound quality experienced by an occupant of the vehicle. The method 400 may be implemented as executable instructions in memory of a computing device, such as at least one controller of a plurality of controllers in an inflation system used to inflate an inflatable mannequin torso, inflatable mannequin arms, and inflatable mannequin legs to a pre-determined percentage of a percentage threshold.

At 402, the method 400 includes selecting a detachable mannequin head with pre-determined measurement parameters. The detachable mannequin head may be removable, which may allow different heads to be attached to an inflatable mannequin body. Each mannequin profile has a corresponding mannequin head that is detachable with a distinct set of pre-determined measurement parameters. Examples of potential adjustable, pre-determined measurement parameters are described above with respect to FIG. 2A and FIG. 2B. Varying the aforementioned measurement parameters may allow different head shapes and sizes for a range of occupants to be subjected to tests that obtain acoustical measurements. By selecting detachable mannequin heads with the distinct set of pre-determined measurement parameters, the present disclosure enables acoustical measurements to be obtained in a manner that may not be currently done.

In some current vehicle sound testing applications, a single mannequin head with pre-determined measurement parameters is subjected to sound field testing when obtaining acoustical measurements. As described above, head shape and size affects how sound impinges toward the head. Using the single mannequin head with pre-determined measurement parameters limits the testing conditions, and therefore, limits the quality of the acoustical measurements as the audio processing scheme used to increase sound quality in the vehicle may not have a broader application beyond the conditions that were tested. By using different mannequin heads that are detachable with distinct sets of pre-determined measurement parameters for a plurality of mannequin profiles, the testing conditions are broadened and the quality of the acoustical measurements may increase due to the audio processing scheme being configured based on a larger data set. As such, the audio processing scheme used to increase the sound quality in the vehicle may have a broader application and may be applied to sound environments that were not tested during the acoustical measurements (e.g., data extrapolation) without affecting sound quality in the vehicle.

At 404, the method 400 includes selecting a torso length, an arm length, and a leg length for the inflatable mannequin. As discussed above with respect to FIG. 3A, the inflatable mannequin may comprise a mannequin skeleton which includes a plurality of extendable mannequin skeleton parts. For example, the mannequin skeleton may include a lower extendable mannequin skeleton spine, a first extendable left mannequin skeleton arm, a second extendable left mannequin skeleton arm, a first extendable right mannequin skeleton arm, a second extendable right mannequin skeleton arm, a first extendable left mannequin skeleton leg, a second extendable left mannequin skeleton leg, a first extendable right mannequin skeleton leg, and a second extendable right mannequin skeleton leg.

Each extendable mannequin skeleton part in the plurality of extendable mannequin skeleton parts may have a pre-determined length threshold with a lower threshold limit and an upper threshold limit. For example, the lower extendable mannequin skeleton spine may have a lower limit threshold and an upper limit threshold to ensure that the total torso length ranges from, for example, 13.5 inches to 24.5 inches, which is below an average total torso length for women and above an average total torso length for men. As another example, the second extendable left mannequin skeleton leg (e.g. lower left leg) and the second extendable right mannequin skeleton leg (e.g., lower right leg) may have a lower limit threshold and upper limit threshold wherein the lower limit threshold may describe a value below an average lower leg length for women and the upper limit threshold may describe a value above an average lower leg length for men. Accordingly, threshold values may be set for the first extendable left mannequin skeleton arm, the second extendable left mannequin skeleton arm, the first extendable right mannequin skeleton arm, the second extendable right mannequin skeleton arm, the first extendable left mannequin skeleton leg, and the first extendable right mannequin skeleton leg.

By selecting various lengths for the mannequin skeleton torso and mannequin skeleton legs, mannequin profiles for occupants of different heights may be subjected to testing in order to obtain acoustical measurements. Additionally, by selecting various lengths for the mannequin skeleton arms, mannequin profiles for occupants with different arm spans may subjected to testing in order to obtain acoustical measurements. Accordingly, additional testing conditions may be subjected to the acoustical tests, which may increase the amount of relevant data. Audio processing schemes developed from the aforementioned data may widen the size of the sweet spot and increase the sound quality experienced by the occupant of the vehicle.

At 406, the method 400 includes adjusting the torso length, the arm length, and leg length for the inflatable mannequin. A method for adjusting the lengths of the plurality of extendable mannequin skeleton parts may include a telescoping mechanism. In particular, each extendable mannequin skeleton part in the plurality of extendable mannequin skeleton parts may comprise tubular structures wherein a diameter of at least one of a first tubular structure and a second tubular structure exceeds the diameter of the other tubular structure. As such, the first tubular structure may fit inside the second tubular structure with sufficient clearance or the second tubular structure may fit inside the first tubular structure with sufficient clearance, enabling at least one of the first tubular structure and the second tubular structure to move up and down within an annular space between the first tubular structure and the second tubular structure. Other embodiments of the present disclosure may utilize alternative structural arrangements and geometries that enable length adjustment of the plurality of extendable mannequin skeleton parts.

In some embodiments of the present disclosure, an electronic control system may adjust the plurality of extendable mannequin skeleton parts. The electronic control system may comprise at least one controller in a plurality of controllers wherein executable instructions may be stored in at least one memory of a plurality of memories and executed by at least one processor of a plurality of processors of the at least one controller to adjust the lengths of the plurality of extendable mannequin skeleton parts via motors. In other embodiments of the present disclosure, the electronic control system may be a joint control system as described in FIG. 5. Additionally, another embodiment of the present disclosure may utilize other methods for adjusting the lengths of the plurality of extendable mannequin skeleton parts, such as adjusting the plurality of extendable mannequin parts manually, for example.

At 408, the method 400 includes selecting an inflation level for the inflatable mannequin torso. The inflation level of the inflatable mannequin torso may be defined by a non-negative, positive value threshold. For example, the inflation level of the inflatable mannequin torso may have a lower threshold limit of 0% and an upper threshold limit of 100%. The lower threshold limit may describe a condition in which the inflatable mannequin torso is not inflated at all. In some embodiments, the lower threshold limit may describe a condition in which the inflatable mannequin torso is at least partially inflated as to simulate the human body. Particularly, the rigidity of the material used to fabricate a mannequin skeleton torso of the inflatable mannequin torso may alter sound fields in the interior space of the vehicle, and therefore, affect the quality of the acoustical measurements that are obtained during testing. In contrast, the upper threshold limit may describe a condition wherein the inflatable mannequin torso is fully inflated.

As described above with respect to FIG. 3A, FIG. 3B, and FIG. 3C, the inflatable mannequin torso may comprise a first mannequin torso inflation compartment that inflates a left portion of the inflatable mannequin torso (e.g., left portion of an inflatable mannequin chest) and a second mannequin torso inflation compartment that inflates a right portion of the inflatable mannequin torso (e.g., right portion of the inflatable mannequin chest). The inflatable mannequin torso may further comprise a third mannequin torso inflation compartment that inflates an inflatable mannequin back, and a fourth mannequin torso inflation compartment that inflates a lower portion of the inflatable mannequin torso (e.g., inflatable mannequin stomach or abdominal region).

The first mannequin torso inflation compartment, the second mannequin torso inflation, the third mannequin torso inflation compartment, and the fourth mannequin torso inflation compartment may be defined by non-negative, positive values that may range from a lower threshold limit (e.g., 0% inflation) to an upper threshold limit (e.g., 100% inflation). As such, the inflation level for a particular inflation compartment of the inflatable mannequin torso may be set independently from the plurality of inflation compartments for the inflatable mannequin torso. For example, the first mannequin torso inflation compartment may be set to an inflation pressure level of 60%, the second mannequin torso inflation compartment may be set to an inflation pressure level of 55%, the third mannequin torso inflation compartment may be set to an inflation pressure level of 30%, and the fourth mannequin torso inflation compartment may be set to an inflation pressure level of 40%.

As described above, the quality of sound experienced by the occupant may be affected by the manner wherein sound impinges toward the inflatable mannequin torso. Current sound testing applications rely on a single mannequin torso size and audio processing schemes are developed based on the single mannequin torso. As a result, data collected during acoustical measurement tests and the audio processing scheme developed based on the data may be limited in its application, which may result in poor vehicle sound quality in conditions that were not tested. By varying the size of the inflatable mannequin torso based on a selected inflation level or inflation pressure level for the plurality of mannequin profiles, the effect of an inflatable mannequin torso size on sound fields and how sounds impinge towards the ear after encountering the inflatable mannequin torso may be accounted for when developing audio processing schemes. In turn, the size of the sweet spot may increase and the sound quality experienced by the occupant in the vehicle may increase.

At 410, the method 400 includes inflating the mannequin torso to the target level using an inflation system. In one embodiment, the inflation system may comprise at least one controller in a plurality of controllers wherein executable instructions for implementing the method may be stored in at least one memory of a plurality of memories and executed by at least one processor of a plurality of processors of the at least one controller. The inflation system may further include a compressor operatively coupled to an actuator that is communicatively coupled to the at least one controller to provide air to the inflatable mannequin torso and at least one pressure sensor communicatively coupled to the at least one controller that is on or near the inflatable mannequin torso. The at least one pressure sensor may monitor pressure of an interior space of the inflatable mannequin, such as the plurality of inflation compartments of the inflatable mannequin torso, to achieve the target inflation pressure level of the inflatable mannequin torso. The inflation pressure level may be automatically controlled to the target based on feedback from one or more pressure sensors coupled to the inflatable mannequin via the actuator.

In another embodiment, the inflation system may comprise additional controllers for the mannequin torso. For example, the inflation system may include a second controller of the plurality of controllers to inflate the mannequin torso wherein instructions for implementing the method may be stored in memory of a plurality of memories and executed by a first processor of a plurality of processors of the second controller. The inflation system may include the compressor described above and at least one pressure sensor on or near the inflatable mannequin torso that monitors that pressure of the interior space of the inflatable mannequin to achieve the target inflation pressure level of the inflatable mannequin torso. In this way, the compressor via the actuator may provide air flow to the inflatable mannequin torso during inflation and the target inflation pressure levels may be achieved by monitoring the pressure in the inflatable mannequin torso. Other embodiments of the inflation system may include additional pressure sensors for each mannequin torso inflation compartment in the plurality of inflation compartments for the inflatable mannequin torso.

Other embodiments may utilize other methods for achieving the target inflation pressure level of the inflatable mannequin torso, such as temporal methods and the like. Additionally, in some embodiments of the present disclosure, the inflation system may be wireless and battery operated. Other embodiments of the inflation system may utilize circuitry and electrical wires connected to an external power source to power the inflation system. Regardless of the embodiment, acoustical measurements are not taken while adjusting the pressure or inflation pressure level of the plurality of anatomical parts of the inflatable mannequin.

At 412, the method 400 includes selecting an inflation level for inflatable mannequin arms. The inflation level of the inflatable mannequin arms may be defined by a non-negative, positive value threshold. For example, the inflation level of the inflatable mannequin arms may have a lower threshold limit of 0% and an upper threshold limit of 100%. The lower threshold limit may describe a condition in which the inflatable mannequin arms are not inflated at all. In some embodiments, the lower threshold limit may describe a condition in which the inflatable mannequin arms are at least partially inflated as to simulate the human body. Particularly, the rigidity of the material used to fabricate mannequin skeleton arms of the inflatable mannequin arms may alter sound fields in the interior space of the vehicle, and therefore, affect the quality of the acoustical measurements that are obtained during testing. In contrast, the upper threshold limit may describe a condition in which the inflatable mannequin arms are fully inflated.

As described above with respect to FIG. 3A, FIG. 3B, and FIG. 3C, the inflatable mannequin arms may comprise a first left mannequin arm inflation compartment and a first right mannequin arm inflation compartment that inflates an upper portion of the inflatable mannequin arms (e.g., from an inflatable mannequin elbow to just below a mannequin shoulder). The inflatable mannequin arms may further comprise a second left mannequin arm inflation compartment and a second right mannequin arm inflation compartment that inflates a lower portion of the inflatable mannequin arms (e.g., from the mannequin elbow to a mannequin wrist). Additionally, the inflatable mannequin arms may comprise a third left mannequin arm inflation compartment and a third right mannequin arm inflation compartment that inflates the inflatable mannequin shoulders.

The first left mannequin arm inflation compartment and the first right mannequin inflation compartment may be defined by a non-negative, positive value that may range from a lower threshold limit (e.g., 0% inflation) to an upper threshold limit (e.g., 100% inflation). Similarly, the inflation level of the second left mannequin arm inflation compartment and the second right mannequin arm inflation compartment may be defined by a separate non-negative, positive value that may range from a lower threshold limit (e.g., 0% inflation) to an upper threshold limit (e.g., 100% inflation). Additionally, the inflation level of the third left mannequin arm inflation compartment and the third right mannequin arm inflation compartment may be defined by a separate non-negative, positive value that may range from a lower threshold limit (e.g., 0% inflation) to an upper threshold limit (e.g., 100% inflation).

As such, the inflation level for a particular inflation compartment of the inflatable mannequin arms may be set independently from the plurality of inflation compartments for the inflatable mannequin arms. For example, the first left mannequin arm inflation compartment may be set to an inflation pressure level of 50% and the second left mannequin arm inflation compartment may be set to an inflation pressure level of 30% whereas the third left mannequin arm inflation compartment may be set to an inflation pressure level of 20%. In other examples, the inflation pressure levels might differ between the right and left inflatable mannequin arms to simulate a dominant side (e.g., right handed vs. left handed).

As described above, the quality of sound experienced by the occupant may be affected by the manner wherein sound impinges toward the arms. Current sound testing applications rely on mannequin arms with a pre-determined size and audio processing schemes are developed based on the pre-determined size of the mannequin arms. As a result, data collected during acoustical measurement tests and the audio processing scheme developed based on the data may be limited in its application and may result in poor vehicle sound quality in conditions that were not tested (e.g., alternative arm sizes). By varying the size of the inflatable mannequin arms based on a selected inflation level for the plurality of mannequin profiles, the effect of inflatable mannequin arm size on sound fields and how sounds impinge towards the ear after encountering the mannequin arms may be accounted for when developing audio processing schemes. As such, the size of the sweet spot may increase and the sound quality experienced by the occupant of the vehicle may increase.

At 414, the method 400 includes inflating the mannequin arms to the target level using the inflation system. In one embodiment, the inflation system may use the inflation system, components, and method described above for the inflatable mannequin torso. In particular, the at least one controller in the plurality of controllers wherein executable instructions may be stored in at least one memory of the plurality of memories and executed by at least one processor of the plurality of processors of the at least one controller may be configured to inflate the inflatable mannequin arms to the target pressure level. The inflation system may further include the compressor operatively coupled to the actuator that is communicatively coupled to the at least one controller to provide air to the inflatable mannequin arms and at least one pressure sensor communicatively coupled to the at least one controller that is on or near the inflatable mannequin arms. The at least one pressure sensor may monitor pressure of an interior space of the inflatable mannequin, such as an inflation compartment of the inflatable mannequin arms, to achieve the target inflation pressure level of the inflatable mannequin arms. The inflation pressure level is automatically controlled to the target based on feedback from one or more pressure sensors coupled to the inflatable mannequin via the actuator.

In another embodiment, the inflation system may comprise additional controllers for the inflatable mannequin arms. For example, the inflation system may utilize the second controller in the plurality of controllers described above to inflate the inflatable mannequin arms. In another example, a third controller in the plurality of controllers wherein instructions for implementing the method may be stored in memory of a plurality of memories and executed by processor of a plurality of processors of the third controller may be configured to inflate the inflatable mannequin arms. The inflation system may include the compressor described above to inflate the inflatable mannequin arms and at least one pressure sensor on or near the left or right mannequin arms that monitors that pressure of the interior space of the inflatable mannequin to achieve the target inflation pressure level of the inflatable mannequin arms. In this way, the compressor in the inflation system may provide air flow to a right inflatable mannequin arm and a left inflatable mannequin arm during inflation and the inflation pressure levels may be achieved by monitoring the pressure level in the inflatable mannequin arms. Other embodiments of the inflation system may include additional pressure sensors for each mannequin arm inflation compartment in the plurality of inflation compartments for the inflatable mannequin arms.

Other embodiments of the present disclosure may utilize other methods for achieving the target inflation pressure level of the mannequin arms instead of using pressure sensors, such as temporal methods and the like. Additionally, the inflation system may be wireless and battery operated or may utilize circuitry and electrical wires connected to an external power source to power the inflation system. Regardless of the embodiment, acoustical measurements are not taken while adjusting the pressure or inflation pressure level of the plurality of anatomical parts of the inflatable mannequin.

At 416, the method 400 includes selecting an inflation level for inflatable mannequin legs. The inflation level of the inflatable mannequin legs may be defined by a non-negative, positive value threshold. For example, the inflation level of the inflatable mannequin legs may have a lower threshold limit of 0% and an upper threshold limit of 100%. The lower threshold limit may describe a condition in which the inflatable mannequin legs are not inflated at all. In some embodiments, the lower threshold limit may describe a condition in which the inflatable mannequin legs are at least partially inflated as to simulate the human body. Particularly, the rigidity of the material used to fabricate mannequin skeleton legs of the inflatable mannequin legs may alter sound fields in the interior space of the vehicle, and therefore, affect the quality of the acoustical measurements that are obtained during testing. In contrast, the upper threshold limit may describe a condition in which the inflatable mannequin legs are fully inflated.

As described above with respect to FIG. 3A, FIG. 3B, and FIG. 3C, the inflatable mannequin legs may comprise a first left mannequin leg inflation compartment and a first right mannequin leg inflation compartment that inflates an upper portion of the inflatable mannequin legs (e.g., from an inflatable mannequin knee to just below a mannequin hip). The inflatable mannequin legs may further comprise a second left mannequin leg inflation compartment and a second right mannequin leg inflation compartment that inflates a lower portion of the inflatable mannequin legs (e.g., from the mannequin knee to a mannequin ankle). Additionally, the inflatable mannequin legs may comprise a third left mannequin leg inflation compartment and a third right mannequin leg inflation compartment that inflates the inflatable mannequin hips and gluteal muscles The first left mannequin leg inflation compartment and the first right mannequin inflation compartment may be defined by a non-negative, positive value that may range from a lower threshold limit (e.g., 0% inflation) to an upper threshold limit (e.g., 100% inflation). Similarly, the inflation level of the second left mannequin leg inflation compartment and the second right mannequin leg inflation compartment may be defined by a separate non-negative, positive value that may range from a lower threshold limit (e.g., 0% inflation) to an upper threshold limit (e.g., 100% inflation). Additionally, the inflation level of the third left mannequin leg inflation compartment and the third right mannequin leg inflation compartment may be defined by a separate non-negative, positive value that may range from a lower threshold limit (e.g., 0% inflation) to an upper threshold limit (e.g., 100% inflation).

As such, the inflation level for a particular inflation compartment of the inflatable mannequin legs may be set independently from the plurality of inflation compartments. For example, the first left mannequin leg inflation compartment may be set to an inflation pressure level of 60% and the second left mannequin leg inflation compartment may be set to an inflation pressure level of 50% whereas the third left mannequin leg inflation compartment may be set to an inflation pressure level of 30%. In other examples, the inflation levels might differ between the right inflatable mannequin leg and the left inflatable mannequin leg as to simulate a dominant side (e.g., right handed vs. left handed).

As described above, the quality of sound experienced by the occupant may be affected by the manner wherein sound impinges toward the legs. Current sound testing applications rely on mannequin legs with a pre-determined size and audio processing schemes are developed based on the pre-determined size of the mannequin legs. As a result, data collected during acoustical measurement tests and the audio processing scheme developed based on the data may be limited in its application and may result in poor vehicle sound quality in conditions that were not tested (e.g., alternative leg sizes). By varying the size of the inflatable mannequin legs based on a selected inflation level for the plurality of mannequin profiles, the effect of inflatable mannequin leg size on sound fields and how sounds impinge towards the ear after encountering the mannequin legs may be accounted for when developing audio processing schemes. As such, the size of the sweet spot may be increased and the sound quality experienced by the occupant of the vehicle may increase.

At 418, the method 400 includes inflating the mannequin legs to the target level using the inflation system. In one embodiment, the inflation system may use the inflation system, components, and method described above for the inflatable mannequin torso and inflatable mannequin arms. In particular, the at least one controller in a plurality of controllers wherein executable instructions may be stored in at least one memory of a plurality of memories and executed by at least one processor of a plurality of processors of the at least one controller may be configured to inflate the inflatable mannequin legs to the target level. The inflation system may further include the compressor operatively coupled to the actuator that is communicatively coupled to the at least one controller to provide air to the inflatable mannequin legs and at least one pressure sensor communicatively coupled to the at least one controller that is on or near the inflatable mannequin legs. The at least one pressure sensor may monitor pressure of an interior space of the inflatable mannequin, such as an inflation compartment of the inflatable mannequin legs, to achieve the target inflation pressure level of the inflatable mannequin legs. The inflation pressure level is automatically controlled to the target based on feedback from one or more pressure sensors coupled to the inflatable mannequin via the actuator.

In another embodiment, the inflation system may comprise additional controllers for the mannequin legs. For example, the inflation system may include the second and third controllers discussed above to inflate the inflatable mannequin legs. As another example, the inflation system may include a fourth controller of a plurality of controllers to inflate the mannequin legs wherein instructions for implementing the method may be stored in memory and executed by a processor of the fourth controller. The inflation system may include the compressor described above to inflate the inflatable mannequin legs and at least one pressure sensor on or near the left or right inflatable mannequin leg that monitors that pressure of the interior space of the inflatable mannequin to achieve the target inflation pressure level of the inflatable mannequin legs. In this way, the compressor via the actuator may provide air flow to the right and left inflatable mannequin legs during inflation and the inflation pressure levels can be achieved by monitoring the pressure level in the inflatable mannequin legs. Other embodiments of the inflation system may include additional pressure sensors for each mannequin leg inflation compartment in the plurality of inflation compartments for the inflatable mannequin legs.

Other embodiments of the present disclosure may utilize other methods for achieving the target inflation pressure level of the mannequin legs instead of using pressure sensors, such as temporal methods and the like. Additionally, the inflation system may be wireless and battery-operated or may utilize circuitry and electrical wires connected to an external power source to power the inflation system. The method 400 then returns.

It may be understood that the provided examples are illustrative rather than absolute and the method 400 may be implemented with a different inflation scheme. In some embodiments, the order in which the inflatable anatomical parts of the inflatable mannequin are inflated may differ. For example, the inflation pressure level of the inflatable mannequin legs may be set and inflated first, the inflation pressure level of the inflatable mannequin arms may bet set and inflated second, the inflation pressure level of the inflatable mannequin torso may bet set and inflated third, and the detachable mannequin head may be selected last. In other embodiments, the inflation pressure level of the inflatable mannequin torso, inflatable mannequin legs, and inflatable mannequin arms may be set prior to inflating any of the inflatable anatomical parts of the mannequin. Other embodiments may have alternative inflation schemes beyond the examples provided. Regardless of the embodiment, acoustical measurements are not taken while adjusting the pressure or inflation pressure level of the plurality of inflatable anatomical parts of the inflatable mannequin.

FIG. 5 provides an example of a mannequin profile 500 according to the method 400 of FIG. 4. The mannequin profile 500 may comprise an inflatable mannequin 501 with a plurality of inflatable anatomical parts that include a plurality of inflation compartments. For example, the inflatable mannequin 501 may include an inflatable mannequin torso, inflatable mannequin legs, and inflatable mannequin arms. The inflatable mannequin torso may include a first mannequin torso inflation compartment 506L, a second mannequin torso inflation compartment 506R, a third mannequin torso inflation compartment 508, and a fourth mannequin torso inflation compartment. The inflatable mannequin legs may include a first left mannequin leg inflation compartment 512L, a second left mannequin leg inflation compartment 514L, a third left mannequin leg inflation compartment 510L, a first right mannequin leg inflation compartment 512R, a second right mannequin leg inflation compartment 514R, and a third right mannequin leg inflation compartment 510R. The inflatable mannequin arms may include a first left mannequin arm inflation compartment 516L, a second left mannequin arm inflation compartment 518L, a third left mannequin arm inflation compartment 504L, a first right mannequin arm inflation compartment 516R, a second right mannequin arm inflation compartment 518R, and a third right mannequin arm inflation compartment 504R.

At t0, the inflatable mannequin 501 may be configured according to a default mannequin profile wherein the default mannequin profile includes a default set of pre-determined values for lengths of a plurality of extendable mannequin skeleton parts and target inflation levels for the plurality of inflation compartments of the inflatable mannequin 501. Each inflation compartment in the plurality of inflation compartments may be set to the same inflation pressure level (e.g., 15%), as one example. As another example, the inflation pressure level may be set independently for the inflatable mannequin torso, inflatable mannequin legs, and inflatable mannequin arms. In particular, the inflation pressure level may be set to a target of 10% for the plurality of inflation compartments of the inflatable mannequin torso, 15% for the plurality of inflation compartments of the inflatable mannequin arms, and 15% for the plurality of inflation compartments of the inflatable mannequin arms.

At tn, the inflatable mannequin 501 may be configured according to the mannequin profile 500 wherein the mannequin profile 500 includes a set of pre-determined values for lengths of the plurality of extendable mannequin skeleton parts and target inflation levels for the plurality of inflation compartments of the inflatable mannequin 501. As illustrated in FIG. 5, the set of pre-determined values for the mannequin profile 500 at tn differs from the default set of pre-determined values at t0. In particular, the size of the plurality of inflation compartments for the inflatable mannequin 501 have increased from t0 to tn responsive to an increase in the target of the inflation pressure level for the plurality of inflation compartments. Additionally, the lengths of the plurality of extendable mannequin skeleton parts are maintained from the default mannequin profile.

As such, the inflatable mannequin 501 may be configured according to the mannequin profile 500 as acoustical measurements are conducted during sound field testing. Other embodiments of the present disclosure may utilize additional or alternative mannequin profiles than described herein. For example, in another embodiment, inflation compartments configured according to the mannequin profile 500 may decrease in size responsive to a decrease in the target of the inflation pressure level instead. As another example, a subset of the plurality of the inflation compartments of the mannequin profile 500 may decrease in size and another subset of the plurality of inflation compartments of the mannequin profile 500 may increase in size responsive to a decrease and increase of targets of the inflation pressure level for various inflation compartments.

Figure 6:
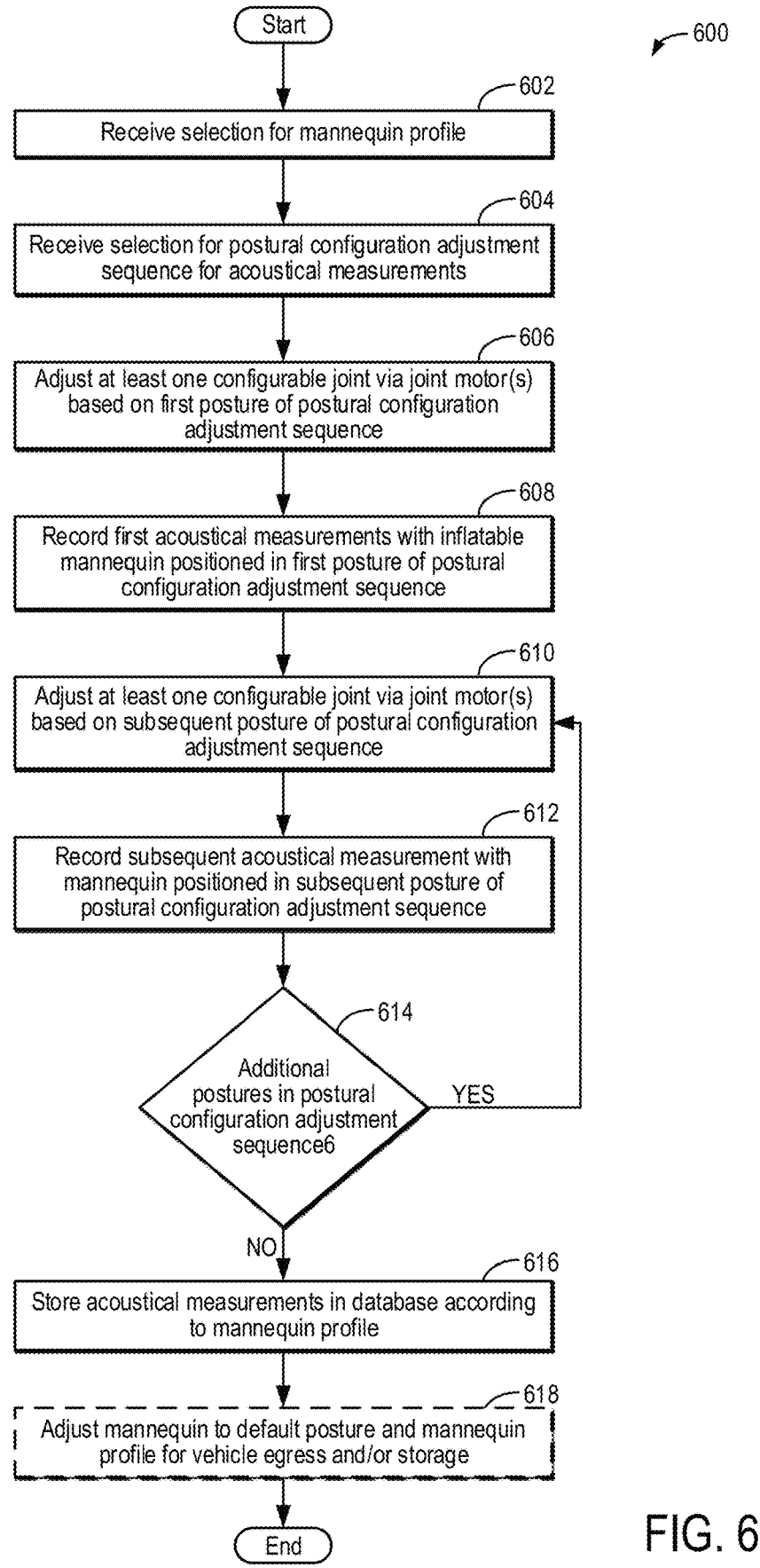
FIG. 6 shows a flow chart of a sequence of postural changes for a mannequin and corresponding sound field measurements, according to one or more embodiments.

FIG. 6 provides an example method 600 for adjusting postural configurations of an inflatable mannequin (e.g., the inflatable mannequin of FIG. 3A, FIG. 3B, and FIG. 3C) to conduct acoustical measurement and record the corresponding acoustical measurements. The method 600 will be described with regard to the system and components shown in FIGS. 1-3C, although it may be understood that the method 600 may be implemented with other systems and components without departing from the scope of this disclosure. In particular, the method may be implemented as executable instructions in memory of a computing device, such as at least one controller of a plurality of controllers in an electronic system used to adjust different joints (e.g., the joints as described in FIG. 3A) in the inflatable mannequin to position the inflatable mannequin in a plurality of postures based on a postural configuration adjustment sequence. In this way, different postural configurations of the inflatable mannequin may be subjected to testing for acoustical measurements.

At 602, the method 600 includes receiving a selection for a mannequin profile. The mannequin profile of a plurality of mannequin profiles may be created according to the method 400 in FIG. 4. The mannequin profile comprises an inflatable mannequin with pre-determined shapes and sizes for various anatomical parts of the inflatable mannequin, including a detachable mannequin head, an inflatable mannequin torso, inflatable mannequin arms, and inflatable mannequin legs.

Other embodiments of the present disclosure may utilize additional or less anatomical parts of the inflatable mannequin than described herein.

Acoustical measurements may be obtained during sound field testing of the inflatable mannequin wherein the inflatable mannequin may be configured according to the mannequin profile selected. As such, acoustical measurements may not be obtained while adjusting the pressure of the anatomical parts of the inflatable mannequin and the pressure may not be adjusted while obtaining acoustical measurements. In this way, different head shapes and body types may be subjected to testing and acoustical measurements may be obtained for the plurality of mannequin profiles. Accordingly, performing tests and obtaining acoustical measurements for the plurality of mannequin profiles may increase the efficiency of the audio processing schemes developed from the acoustical measurements, which may widen the sweet spot. Therefore, the sound quality experienced by occupants of different shapes and sizes in a vehicle may increase.

At 604, the method 600 includes receiving a selection for a postural configuration adjustment sequence for acoustical measurements. In one embodiment of the present disclosure, the postural configuration adjustment sequence may be pre-determined. In other embodiments of the present disclosure, the postural configuration adjustment sequence may be entered or selected via user input via a user interface of an electronic device, such as a computing device. In further embodiments, the postural configuration adjustment sequence may be generated based on parameters. In one example, the parameters may be related to standard driving postures for an operator of the vehicle. As another example, the parameters may be related to sitting or driving postures for the operator or an occupant who is above average in height. Other embodiments of the present disclosure may use other types of parameters.

The postural configuration adjustment sequence may include a series of pre-determined angle adjustments of a plurality of angle adjustments between at least two anatomical parts in a plurality of anatomical parts of the inflatable mannequin. The plurality of angle adjustments made in the postural configuration adjustment sequence may be between the same at least two anatomical parts or between different anatomical parts in the plurality of anatomical parts. Incremental angle adjustments of at least one angle of a plurality of angles between the at least two anatomical parts may enable more refined postural configuration adjustments to be made to the inflatable mannequin. As such, the inflatable mannequin may be positioned in the plurality of postures based on the postural configuration adjustment sequence, and subjected to sound field testing in the vehicle for acoustical measurements.

As one example, the at least one angle of a plurality of angles between at least two anatomical parts of the inflatable mannequin may be defined by a finite value threshold with a lower limit and an upper limit. Depending on a pre-determined initial angle and a relative position of the initial angle with respect to 2-dimensional articulation axes of the inflatable mannequin, angle threshold values may be zero or non-zero (e.g. positive or negative). In one embodiment of the present disclosure, the at least one angle may be between the detachable mannequin head and a mannequin neck. By adjusting the at least one angle between the detachable mannequin head and the mannequin neck, different configurations of the position of the detachable mannequin head relative to an inflatable mannequin body may be tested while obtaining acoustical measurements. In particular, the mannequin head may be tilted further to the right or left and tilted up and down.

In another embodiment, the at least one angle may be between a mannequin shoulder and an upper mannequin arm. As a result of adjusting the at least one angle between the mannequin shoulder and the upper mannequin arm, different configurations of the position of the upper mannequin arm relative to the inflatable mannequin torso may be tested while conducting acoustical measurements. Specifically, the upper mannequin arm may be positioned further from the side of the inflatable mannequin torso or closer to the side of the inflatable mannequin torso depending on a selected angle for the at least one angle.

The at least one angle may be between the inflatable mannequin torso and the inflatable mannequin legs in other embodiments of the present disclosure. Adjustments to the at least one angle between the inflatable mannequin torso and inflatable mannequin legs may enable different configurations of the position of the inflatable mannequin torso relative to the mannequin legs to be tested while conducting acoustical measurements. As such, the inflatable mannequin may be able to simulate an occupant leaning forward toward the front of the vehicle or leaning backward toward the back seats. Adjusting the at least one angle between the inflatable mannequin torso and the sides of the inflatable mannequin legs may be another embodiment of the present disclosure. Different configurations of the position of the inflatable mannequin torso relative to the sides of the inflatable mannequin legs (e.g., hip) may be enabled by adjusting the at least one angle. Accordingly, the inflatable mannequin may be able to simulate an occupant leaning to the right or leaning to the left.

Further embodiments of the present disclosure may include the at least one angle being between the upper mannequin arm and a lower mannequin arm or the at least one angle being between an upper mannequin leg and a lower mannequin leg. By adjusting the at least one angle between the upper mannequin arm and the lower mannequin arm or the at least one angle between the upper mannequin leg and the lower mannequin leg, the inflatable mannequin arms and inflatable mannequin legs may be positioned in the plurality of postures. In particular, angle adjustments between the upper mannequin arm and lower mannequin arm or the upper mannequin leg and the lower mannequin leg may simulate bending of the arms and legs of the occupant.

Other embodiment may utilize a second angle of the plurality of angles between at least two anatomical parts in the plurality of anatomical parts of the inflatable mannequin. In some embodiments, the second angle may incorporate rotational functionalities to the postural configuration of the inflatable mannequin. In other embodiments, the second angle may be between different at least two anatomical parts in the plurality of anatomical parts of the inflatable mannequin than the at least one angle. It may be understood that the examples described herein are illustrative and do not limit the scope of the present disclosure. Other embodiments of the present disclosure may utilize angles between different anatomical parts than described herein and/or may utilize two or more angles between the anatomical parts to increase the number of potential postural configurations of the inflatable mannequin.

Some current systems utilize a mannequin and rely on manual adjustments of the mannequin in the vehicle to achieve different postural configurations of the mannequin. A human eye may not be able to visually detect small incremental angle adjustments easily, and as a result, a person adjusting the mannequin may not be able to make the desired incremental angle adjustments with the desired accuracy for acoustical measurements, affecting the quality of the acoustical measurements. The present disclosure utilizes a joint control system wherein joints may be adjusted via a controller of the joint control system, allowing for more refined incremental angle adjustments of the various anatomical parts of the inflatable mannequin. In this way, a wider variety of postural configurations may be achieved via a joint control system, increasing the possible testing conditions for the acoustical measurements. By increasing the testing conditions, more data can be collected and may increase the ability of the audio processing scheme applied to a plurality of loudspeakers to provide invariable sound quality as the posture of the occupant changes over time. In this way, the quality of the listening experience of the occupant may be increased.

At 606, the method 600 includes adjusting at least one configurable joint via joint motor(s) based on a first posture of the postural configuration adjustment sequence. Examples of a plurality of configurable joints that may adjust the spatial position of various anatomical parts of the inflatable mannequin may be seen in FIG. 3A. In particular, the plurality of configurable joints is positioned in the inflatable mannequin to enable postural configuration adjustments to the detachable mannequin head, the inflatable mannequin torso, the inflatable mannequin arms, and the inflatable mannequin legs. In particular, the inflatable mannequin may be positioned in the first posture by adjusting motors at the joints responsive to a desired position of the inflatable mannequin. Other embodiments of the present disclosure may include a smaller or larger number of configurable joints than illustrated in FIG. 3A.

The first posture of the postural configuration adjustment sequence may be one posture of the plurality of postures of the postural configuration adjustment sequence. Each posture in the plurality of postures in the postural configuration adjustment sequence may have a set of pre-determined angles between the plurality of anatomical parts of the inflatable mannequin. As such, the inflatable mannequin may be configured according to the set of pre-determined angles by joint motors that are electronically and mechanically coupled to the plurality of configurable joints. Further, the joint motors may be communicatively coupled to a joint control system that calibrates and controls the plurality of configurable joints via the joints motors.

In one embodiment, the joint control system may comprise at least one controller of a plurality of controllers wherein executable instructions for controlling the joint motors and the plurality of configurable joints may be stored in at least one memory of a plurality of memories and executed by at least one processor of a plurality of processors in the at least one memory of the at least one controller. Other embodiments of the controller may include a plurality of memories and a user interface. The at least one controller in the plurality of controllers may be operatively coupled to the joint motors and configured to execute instructions that adjust the plurality of configurable joints via the joint motors based on set point position and feedback from encoders on joints. For example, an angle of a first configurable joint that positions a specific anatomical part of the inflatable mannequin may be adjusted via the joint motors according to executable instructions stored in the at least one controller to encompass various postural configurations of the inflatable mannequin in some embodiments. Further, the at least one controller may be configured to execute instructions in this manner for each configurable joint in the plurality of configurable joints.

In another embodiment, the joint control system may utilize designated controllers in the plurality of controllers for specific joints. In one example, a first controller may adjust the joint motors of the configurable joints that position the detachable mannequin head and inflatable mannequin torso, a second controller may adjust the joint motors of the configurable joints that position the inflatable mannequin arms, and a third controller may adjust the joint motors of the configurable joints that position the inflatable mannequin legs. In another example, the first controller may adjust the joint motors of the configurable joints that position the detachable mannequin head, the second controller may adjust joint motors of the configurable joints that position the inflatable mannequin torso, the third controller may adjust the joint motors of the configurable joints that position the inflatable mannequin arms, and a fourth controller may adjust the joint motors of the configurable joints that position the inflatable mannequin legs.

Other embodiments of the joint control system may utilize additional or alternative control schemes and controllers to control the joint motors and the plurality of configurable joints of the inflatable mannequin than described herein. In some embodiments of the present disclosure, the joint control system may be wireless and battery-operated. In contrast, some embodiments of the joint control system may utilize circuitry and electrical wires connected to an external power source to power the joint control system.

At 608, the method 600 includes recording acoustical measurements with the inflatable mannequin positioned in the first posture of the postural configuration adjustment sequence. Acoustical measurements may be obtained from a series of tests performed within an audio system in the vehicle. For example, impulse response tests may be performed to assess the transfer functions from the plurality of loudspeakers in an audio system of the vehicle to the microphones embedded in the detachable mannequin head. As another example, distortion tests assess components in the audio system to determine whether the components are operating at an upper limit of operation and creating distortion of sounds waves. The examples above are illustrative and do not limit the scope of the present disclosure with regards to the types of tests performed and the acoustical measurements obtained.

In one embodiment of the present disclosure, sound may be received at the microphones embedded in the detachable mannequin head. Sound may be converted to an audio signal and the audio signal may be processed and recorded in memory of the joint control system. The acoustical measurements may be determined based on various audio signals obtained during testing. In some embodiments, the joint control system may adjust the postural configuration of the mannequin and a control system may convert and process audio signals for acoustical measurements. Additionally, the acoustical measurements may be recorded for the corresponding mannequin profile based on a target, such as a target pressure for a pressure inflation level of the mannequin profile or a target position wherein inflation adjusts the position of the various anatomical parts or surface of the various anatomical parts. Similarly, the acoustical measurements may be recorded for the corresponding mannequin profile based on the desired position (e.g., the first posture).

At 610, the method 600 includes adjusting at least one configurable joint via joint motor(s) based on a subsequent posture of the postural configuration adjustment sequence.

Examples of the plurality of configurable joints that may adjust the spatial position of various anatomical parts of the inflatable mannequin may be seen in FIG. 3A. As described herein, the plurality of configurable joints is positioned in the inflatable mannequin to enable postural configuration adjustments to the detachable mannequin head, the inflatable mannequin torso, the inflatable mannequin arms, and the inflatable mannequin legs.

The subsequent posture of the postural configuration adjustment sequence may be one posture of the plurality of postures of the postural configuration adjustment sequence. The subsequent posture may have a set of pre-determined angles between the plurality of anatomical parts of the inflatable mannequin that differs from a set of pre-determined angles of a previous posture. Similar to the previous posture, the inflatable mannequin may be configured according to the set of pre-determined angles by joint motors that are electronically and mechanically coupled to the plurality of configurable joints. Further, the joint motors may be communicatively coupled to a joint control system that calibrates and controls the plurality of configurable joints via the joints motors. The joint control system and components described above in the method 600 may be used to adjust the inflatable mannequin from the previous posture to the subsequent posture in the postural configuration adjustment sequence.

At 612, the method 600 includes recording the subsequent acoustical measurements with the inflatable mannequin based on the subsequent posture of the postural configuration adjustment sequence. Acoustical measurements may be obtained from the series of tests performed within an audio system in the vehicle. As described above in the method 600, the inflatable mannequin in the subsequent posture may be subjected to impulse response tests, distortion tests, and the like to collect acoustical measurements. The acoustical measurements may be obtained when the microphones embedded in the detachable mannequin head receive sound and sound is converted to an audio signal. As such, the audio signal may be processed and recorded in memory of the joint control system described herein. In some embodiments, the joint control system may adjust the postural configuration of the mannequin and the control system may convert and process audio signals for acoustical measurements. Additionally, the acoustical measurements may be recorded for the corresponding mannequin profile based on the target, such as the target pressure for the pressure inflation level of the mannequin profile or the target position wherein inflation adjusts the position of the various anatomical parts or surface of the various anatomical parts. Similarly, the acoustical measurements may be recorded for the corresponding mannequin profile based on the desired position (e.g., the subsequent posture).

At 614, the method 600 includes determining if there are additional postures in the postural configuration adjustment sequence. The executable instructions in the at least one controller may include a pre-programmed algorithm that executes a sequence of configurable joint adjustments to the inflatable mannequin via joint motors of the configurable joints. The executable instructions may communicate to the joint control system whether there are additional postures in the postural configuration adjustment sequence. In another embodiment, user input via a user interface may be used to determine whether there are additional postures in the postural configuration adjustment sequence. Other embodiments may use alternative or additional methods to determine whether there are additional postures in the postural configuration adjustment sequence.

If there are additional postures in the postural configuration adjustment sequence, then the method 600 includes adjusting at least one configurable joint via joint motor(s) based on the next posture in the postural configuration adjustment sequence and recording acoustical measurements with the inflatable mannequin based on the next posture in the postural configuration adjustment sequence until a termination condition for the postural configuration adjustment sequence is satisfied (e.g., via the pre-programmed algorithm).

If there are no additional postures in the postural configuration adjustment sequence, then the method 600 includes storing acoustical measurements in a database according to the mannequin profile at 616. As described above, the acoustical measurements may be recorded in memory of the joint control system as audio signals. The audio signals may be transmitted or transferred to a database in an external device, such as a memory of a computing device. As such, the database may have a specific address for data or acoustical measurements regarding a particular mannequin profile in the plurality of mannequin profiles. In particular, the acoustical measurements may be stored for the corresponding mannequin profile based on the target, such as the target pressure for the pressure inflation level of the mannequin profile or the target position wherein inflation adjusts the position of the various anatomical parts or surface of the various anatomical parts. Similarly, the acoustical measurements may be stored for the corresponding mannequin profile based on the desired position (e.g., the subsequent posture). The acoustical measurements stored in the database may be accessed for data analysis and accordingly, to develop the audio processing scheme based on the data analysis.

At 618, the method 600 includes adjusting the mannequin to a default posture and mannequin profile for vehicle egress and/or storage. The inflatable mannequin may be adjusted to the default posture in the plurality of postures and the default mannequin profile. For example, the default posture may have a pre-determined set of angles that configure the postural configuration of the inflatable mannequin to increase the ease of vehicle egress/and or storage. Similarly, the default mannequin profile may comprise pre-determined inflation levels that increase the ease of vehicle egress/and or storage. In particular, an inflation level for the plurality of anatomical parts may be set to 0%. In this way, the size of the plurality of anatomical of the inflatable mannequin may be configured according to mannequin skeleton parts (e.g., a mannequin skeleton torso) as described herein. As described herein, the mannequin skeleton part is the smallest size for a particular anatomical part of the inflatable mannequin.

The inflatable mannequin may be adjusted to the default mannequin profile by an inflation system (e.g., inflation system described in FIG. 4) and components of the inflation system. Further, the inflatable mannequin may be adjusted to the default posture by the joint control system and components of the joint control system. It may be understood that other embodiments of the present disclosure may utilize alternative default postures and default mannequin profiles than described herein. Additionally, other embodiments of the present disclosure may utilize other systems to adjust the inflatable mannequin to the default posture and mannequin profile. The method 600 then ends.

The technical effect of conducting acoustical measurements for sound field design via an inflatable mannequin with a detachable mannequin head is that various body shapes and head shapes and sizes of occupants in various postural configurations may be subjected to sound field testing, which may increase the quality of audio processing schemes developed based on the acoustical measurements obtained. As such, the size of a sweet spot in an interior of a vehicle may be increased, increasing the quality of sound experienced by occupants in the vehicle.

The disclosure also provides support for a system, comprising: an inflatable mannequin that comprises a mannequin head, a plurality of inflatable anatomical parts, and a plurality of configurable joints. In a first example of the system, the system further comprises: an inflation system that controls inflation of the plurality of inflatable anatomical parts of the inflatable mannequin, and a joint control system that controls the plurality of configurable joints via joint motors. In a second example of the system, optionally including the first example, the mannequin head is detachable and the mannequin head including cavities positioned in an ear region. In a third example of the system, optionally including one or both of the first and second examples, microphones are embedded via microphone inserts. In a fourth example of the system, optionally including one or more or each of the first through third examples, the plurality of inflatable anatomical parts comprises a mannequin skeleton that includes a plurality of mannequin skeleton parts wherein a mannequin skeleton part is a smallest size configuration for an inflatable anatomical part and a plurality of inflation compartments that envelop or are positioned beside a mannequin skeleton part to increase a size of the plurality of inflatable anatomical parts.

In a fifth example of the system, optionally including one or more or each of the first through fourth examples, the plurality of inflatable anatomical parts further comprises: an inflatable mannequin torso that comprises a mannequin skeleton torso that includes an upper mannequin skeleton torso and a lower extendable mannequin skeleton spine, a first mannequin torso inflation compartment that envelops an upper left ventral portion of the upper mannequin skeleton torso, a second mannequin torso inflation compartment that envelops an upper right ventral portion of the upper mannequin skeleton torso, a third mannequin torso inflation compartment that envelops a dorsal portion of the upper mannequin skeleton torso, and a fourth mannequin torso inflation compartment that envelops the lower extendable mannequin skeleton spine, inflatable mannequin legs that comprise a first extendable left mannequin skeleton leg, a second extendable left mannequin skeleton leg, a first extendable right mannequin skeleton leg, and a second extendable right mannequin skeleton leg, and a first left mannequin leg inflation compartment that envelops the first extendable left mannequin skeleton leg, a second left mannequin leg inflation compartment that envelops the second extendable right mannequin skeleton leg, a third left mannequin leg inflation compartment that is positioned beside an upper ventral and dorsal portion of the first extendable left mannequin skeleton leg, a first right mannequin leg inflation compartment that envelops the first extendable right mannequin skeleton leg, a second right mannequin leg inflation compartment that envelops the second extendable right mannequin skeleton leg, and a third right mannequin leg inflation compartment that is positioned beside the upper ventral and dorsal portion of the first extendable right mannequin skeleton leg, and inflatable mannequin arms that comprise a first extendable left mannequin skeleton arm, a second extendable left mannequin skeleton arm, a first extendable right mannequin skeleton arm, and a second extendable right mannequin skeleton arm, and a first left mannequin arm inflation compartment that envelops the first extendable left mannequin skeleton arm, a second left mannequin arm inflation compartment that envelops the second extendable right mannequin skeleton arm, a third left mannequin arm inflation compartment that is positioned beside the upper ventral and dorsal portion of the first extendable left mannequin skeleton arm, a first right mannequin arm inflation compartment that envelops the first extendable right mannequin skeleton arm, a second right mannequin arm inflation compartment that envelops the second extendable right mannequin skeleton arm, and a third right mannequin arm inflation compartment that is positioned beside the upper ventral and dorsal portion of the first extendable right mannequin skeleton arm.

In a sixth example of the system, optionally including one or more or each of the first through fifth examples, the system further comprises: a controller coupled with an inflation system and a joint control system including instructions for adjusting the plurality of configurable joints via joint motors to position the system in a plurality of postures based on a postural configuration adjustment sequence. In a seventh example of the system, optionally including one or more or each of the first through sixth examples, the inflation system that controls inflation of the plurality of inflatable anatomical parts of the inflatable mannequin comprises: at least one controller in a plurality of controllers wherein executable instructions are stored in at least one memory or a plurality of memories and executed by at least one processor of a plurality of processors to inflate an inflatable mannequin torso, inflatable mannequin legs, and inflatable mannequin arms, a compressor communicatively coupled to the at least one controller to provide air to the inflatable mannequin torso, the inflatable mannequin legs, and the inflatable mannequin arms of the inflatable mannequin, and at least one pressure sensor communicatively coupled to the at least one controller to monitor pressure in an interior space of the inflatable mannequin.

In an eighth example of the system, optionally including one or more or each of the first through seventh examples, the joint control system that controls the plurality of configurable joints via joint motors comprises: at least one controller in a plurality of controllers wherein executable instructions are stored in at least one memory of a plurality of memories and executed by at least one processor of a plurality of processors to adjust a postural configuration of the inflatable mannequin based on set point positions and feedback from encoders on joints, and joint motors that are electronically and mechanically coupled to the plurality of configurable joints and communicatively coupled to the at least one controller.

The disclosure also provides support for a method for creating a mannequin profile in a vehicle, comprising: adjusting lengths of an inflatable mannequin torso that is extendable, inflatable mannequin legs that are extendable, and inflatable mannequin arms that are extendable, adjusting an inflation pressure level of an inflatable mannequin with a plurality of inflatable anatomical parts positioned in the vehicle responsive to a target, and storing acoustical measurements at the target. In a first example of the method, the method further comprises: adjusting motors at joints of the inflatable mannequin responsive to a desired position of the inflatable mannequin, and where storing includes storing acoustical measurements at the target and the desired position. In a second example of the method, optionally including the first example, a head of the inflatable mannequin is a detachable mannequin head calibrated based on point-to-point measurements of the head of the inflatable mannequin, and wherein inflatable anatomical parts are the inflatable mannequin torso that includes an extendable mannequin skeleton torso, inflatable mannequin legs that include extendable mannequin skeleton legs, and inflatable mannequin arms that includes extendable mannequin arms.

In a third example of the method, optionally including one or both of the first and second examples, the method further comprises: adjusting the inflation pressure level of the inflatable mannequin to a plurality of targets and storing acoustical measurements at the plurality of targets. In a fourth example of the method, optionally including one or more or each of the first through third examples, the inflation pressure level is automatically controlled to the target based on feedback from one or more pressure sensors coupled to the inflatable mannequin via an actuator. In a fifth example of the method, optionally including one or more or each of the first through fourth examples, acoustical measurements are not obtained while adjusting pressure, and wherein adjusting of pressure does not occur while obtaining acoustical measurements.

The disclosure also provides support for a method for adjusting a postural configuration of an inflatable mannequin, comprising: receiving a selection for a mannequin profile via a joint control system, receiving a selection for a postural configuration adjustment sequence for acoustical measurements via the joint control system, adjusting at least one configurable joint via one or more joint motors based on a first posture of the postural configuration adjustment sequence via the joint control system, recording acoustical measurements with the inflatable mannequin positioned in the first posture of the postural configuration adjustment sequence via the joint control system, adjusting at least one configurable joint via the one or more joint motors based on a subsequent posture of the postural configuration adjustment sequence via the joint control system, recording subsequent acoustical measurements with the inflatable mannequin based on the subsequent posture of the postural configuration adjustment sequence via the joint control system, storing acoustical measurements in a database according to the mannequin profile, and adjusting the inflatable mannequin to a default posture and mannequin profile for vehicle egress/and or storage via the joint control system.

In a first example of the method, the mannequin profile of a plurality of mannequin profiles for the inflatable mannequin comprises: a detachable mannequin head with pre-determined measurement parameters, an inflatable mannequin torso with a pre-determined inflation level, inflatable mannequin arms with pre-determined inflation levels, inflatable mannequin legs with pre-determined inflation levels, and a default mannequin profile wherein the inflatable mannequin torso, the inflatable mannequin arms, and the inflatable mannequin arms have pre-determined default inflation levels. In a second example of the method, optionally including the first example, receiving the selection for the postural configuration adjustment sequence for acoustical measurements comprises: a series of postures in a plurality of postures wherein the series of postures are configured according to a series of pre-determined angle adjustments of a plurality of angle adjustments, the series of pre-determined angle adjustments are between at least two anatomical parts in a plurality of anatomical parts of the inflatable mannequin, and at least one posture in the series of postures in the plurality of postures is a default posture with pre-determined angles between at least two anatomical parts in the plurality of anatomical parts of the inflatable mannequin.

In a third example of the method, optionally including one or both of the first and second examples, the joint control system comprises: at least one controller in a plurality of controllers wherein executable instructions may be stored in at least one memory of a plurality of memories and executed by at least one processor of a plurality of processors of the at least one controller to achieve a plurality of postures in the postural configuration adjustment sequence, joint motors that are electronically and mechanically coupled to a plurality of configurable joints and communicatively coupled to the at least one controller to achieve the plurality of postures in the postural configuration adjustment sequence, and the plurality of memories of the at least one controller wherein acoustical measurement may be recorded. In a fourth example of the method, optionally including one or more or each of the first through third examples, storing acoustical measurements in the database according to the mannequin profile comprises transferring or transmitting acoustical measurements in a form of audio signals to memory of an external device, such as a computing device, from the joint control system for data analysis and audio processing scheme development.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the embodiments described above with respect to FIGS. 2A-3C. The methods may be performed by executing stored instructions with one or more logic devices (e.g., processors) in combination with one or more hardware elements, such as storage devices, memory, hardware network interfaces/antennas, switches, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," "third," and so on are used merely as labels and are not intended to impose numerical requirements or a particular positional order on their objects unless explicitly stated to the contrary.

The following claims particularly point out subject matter from the above disclosure that is regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A system, comprising:
an inflatable mannequin that comprises a mannequin head, a plurality of inflatable anatomical parts, and a plurality of configurable joints;
wherein the plurality of inflatable anatomical parts comprises a mannequin skeleton that includes a plurality of mannequin skeleton parts; and
wherein a mannequin skeleton part is a smallest size configuration for an inflatable anatomical part and a plurality of inflation compartments that envelop or are positioned beside a mannequin skeleton part to increase a size of the plurality of inflatable anatomical parts.
2. The system of claim 1, further comprising:
an inflation system that controls inflation of the plurality of inflatable anatomical parts of the inflatable mannequin; and
a joint control system that controls the plurality of configurable joints via joint motors.
3. The system of claim 1, wherein the mannequin head is detachable and the mannequin head includes cavities positioned in an ear region.
4. The system of claim 1, wherein microphones are embedded via microphone inserts.
5. The system of claim 1, wherein the plurality of inflatable anatomical parts further comprises:
an inflatable mannequin torso that comprises a mannequin skeleton torso that includes an upper mannequin skeleton torso and a lower extendable mannequin skeleton spine, a first mannequin torso inflation compartment that envelops an upper left ventral portion of the upper mannequin skeleton torso, a second mannequin torso inflation compartment that envelops an upper right ventral portion of the upper mannequin skeleton torso, a third mannequin torso inflation compartment that envelops a dorsal portion of the upper mannequin skeleton torso, and a fourth mannequin torso inflation compartment that envelops the lower extendable mannequin skeleton spine;
inflatable mannequin legs that comprise a first extendable left mannequin skeleton leg, a second extendable left mannequin skeleton leg, a first extendable right mannequin skeleton leg, and a second extendable right mannequin skeleton leg, and a first left mannequin leg inflation compartment that envelops the first extendable left mannequin skeleton leg, a second left mannequin leg inflation compartment that envelops the second extendable right mannequin skeleton leg, a third left mannequin leg inflation compartment that is positioned beside an upper ventral and dorsal portion of the first extendable left mannequin skeleton leg, a first right mannequin leg inflation compartment that envelops the first extendable right mannequin skeleton leg, a second right mannequin leg inflation compartment that envelops the second extendable right mannequin skeleton leg, and a third right mannequin leg inflation compartment that is positioned beside the upper ventral and dorsal portion of the first extendable right mannequin skeleton leg; and
inflatable mannequin arms that comprise a first extendable left mannequin skeleton arm, a second extendable left mannequin skeleton arm, a first extendable right mannequin skeleton arm, and a second extendable right mannequin skeleton arm, and a first left mannequin arm inflation compartment that envelops the first extendable left mannequin skeleton arm, a second left mannequin arm inflation compartment that envelops the second extendable right mannequin skeleton arm, a third left mannequin arm inflation compartment that is positioned beside the upper ventral and dorsal portion of the first extendable left mannequin skeleton arm, a first right mannequin arm inflation compartment that envelops the first extendable right mannequin skeleton arm, a second right mannequin arm inflation compartment that envelops the second extendable right mannequin skeleton arm, and a third right mannequin arm inflation compartment that is positioned beside the upper ventral and dorsal portion of the first extendable right mannequin skeleton arm.
6. The system of claim 1, further comprising a controller coupled with an inflation system and a joint control system including instructions for adjusting the plurality of configurable joints via joint motors to position the system in a plurality of postures based on a postural configuration adjustment sequence.
7. The system of claim 2, wherein the inflation system that controls inflation of the plurality of inflatable anatomical parts of the inflatable mannequin comprises:
at least one controller in a plurality of controllers wherein executable instructions are stored in at least one memory or a plurality of memories and executed by at least one processor of a plurality of processors to inflate an inflatable mannequin torso, inflatable mannequin legs, and inflatable mannequin arms;
a compressor communicatively coupled to the at least one controller to provide air to the inflatable mannequin torso, the inflatable mannequin legs, and the inflatable mannequin arms of the inflatable mannequin; and
at least one pressure sensor communicatively coupled to the at least one controller to monitor pressure in an interior space of the inflatable mannequin.
8. The system of claim 2, wherein the joint control system that controls the plurality of configurable joints via joint motors comprises:
at least one controller in a plurality of controllers wherein executable instructions are stored in at least one memory of a plurality of memories and executed by at least one processor of a plurality of processors to adjust a postural configuration of the inflatable mannequin based on set point positions and feedback from encoders on joints; and
joint motors that are electronically and mechanically coupled to the plurality of configurable joints and communicatively coupled to the at least one controller.
9. A method for creating a mannequin profile in a vehicle, comprising:
adjusting lengths of an inflatable mannequin torso that is extendable, inflatable mannequin legs that are extendable, and inflatable mannequin arms that are extendable;
adjusting an inflation pressure level of an inflatable mannequin with a plurality of inflatable anatomical parts positioned in the vehicle responsive to a target; and
storing acoustical measurements at the target.
10. The method of claim 9, further comprising adjusting motors at joints of the inflatable mannequin responsive to a desired position of the inflatable mannequin, wherein storing includes storing acoustical measurements at the target and the desired position.
11. The method of claim 9, wherein a head of the inflatable mannequin is a detachable mannequin head calibrated based on point-to-point measurements of the head of the inflatable mannequin, and wherein inflatable anatomical parts are the inflatable mannequin torso that includes an extendable mannequin skeleton torso, inflatable mannequin legs that include extendable mannequin skeleton legs, and inflatable mannequin arms that includes extendable mannequin arms.

12. The method of claim 9, further comprising adjusting the inflation pressure level of the inflatable mannequin to a plurality of targets and storing acoustical measurements at the plurality of targets.

13. The method of claim 12, wherein the inflation pressure level is automatically controlled to the target based on feedback from one or more pressure sensors coupled to the inflatable mannequin via an actuator.

14. The method of claim 13, wherein acoustical measurements are not obtained while adjusting pressure, and wherein adjusting of pressure does not occur while obtaining acoustical measurements.

15. A method for adjusting a postural configuration of an inflatable mannequin, comprising:
- receiving a selection for a mannequin profile via a joint control system;
- receiving a selection for a postural configuration adjustment sequence for acoustical measurements via the joint control system;
- adjusting at least one configurable joint via one or more joint motors based on a first posture of the postural configuration adjustment sequence via the joint control system;
- recording acoustical measurements with the inflatable mannequin positioned in the first posture of the postural configuration adjustment sequence via the joint control system;
- adjusting at least one configurable joint via the one or more joint motors based on a subsequent posture of the postural configuration adjustment sequence via the joint control system;
- recording subsequent acoustical measurements with the inflatable mannequin based on the subsequent posture of the postural configuration adjustment sequence via the joint control system;
- storing acoustical measurements in a database according to the mannequin profile; and
- adjusting the inflatable mannequin to a default posture and mannequin profile for vehicle egress and/or storage via the joint control system.

16. The method of claim 15, wherein the mannequin profile of a plurality of mannequin profiles for the inflatable mannequin comprises:
- a detachable mannequin head with pre-determined measurement parameters;
- an inflatable mannequin torso with a pre-determined inflation level;
- inflatable mannequin arms with pre-determined inflation levels;
- inflatable mannequin legs with pre-determined inflation levels; and
- a default mannequin profile wherein the inflatable mannequin torso, the inflatable mannequin arms, and the inflatable mannequin arms have pre-determined default inflation levels.

17. The method of claim 15, wherein receiving the selection for the postural configuration adjustment sequence for acoustical measurements comprises:
- a series of postures in a plurality of postures wherein the series of postures are configured according to a series of pre-determined angle adjustments of a plurality of angle adjustments;
- the series of pre-determined angle adjustments are between at least two anatomical parts in a plurality of anatomical parts of the inflatable mannequin; and
- at least one posture in the series of postures in the plurality of postures is a default posture with pre-determined angles between at least two anatomical parts in the plurality of anatomical parts of the inflatable mannequin.

18. The method of claim 15, wherein the joint control system comprises:
- at least one controller in a plurality of controllers wherein executable instructions may be stored in at least one memory of a plurality of memories and executed by at least one processor of a plurality of processors of the at least one controller to achieve a plurality of postures in the postural configuration adjustment sequence;
- joint motors that are electronically and mechanically coupled to a plurality of configurable joints and communicatively coupled to the at least one controller to achieve the plurality of postures in the postural configuration adjustment sequence; and
- the plurality of memories of the at least one controller wherein acoustical measurement may be recorded.

19. The method of claim 15, wherein storing acoustical measurements in the database according to the mannequin profile comprises transferring or transmitting acoustical measurements in a form of audio signals to memory of an external device, such as a computing device, from the joint control system for data analysis and audio processing scheme development.

* * * * *